(12) United States Patent
Maki

(10) Patent No.: US 10,041,590 B2
(45) Date of Patent: Aug. 7, 2018

(54) SHIFT DRUM ASSEMBLY OF A TRANSMISSION

(71) Applicant: TEAM Industries, Inc., Bagley, MN (US)

(72) Inventor: Gregory L. Maki, Solway, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 15/336,083

(22) Filed: Oct. 27, 2016

(65) Prior Publication Data

US 2017/0108119 A1 Apr. 20, 2017

Related U.S. Application Data

(63) Continuation of application No. 14/281,649, filed on May 19, 2014, now Pat. No. 9,528,603.

(Continued)

(51) Int. Cl.
| | |
|---|---|
| *F16H 63/18* | (2006.01) |
| *F16H 61/682* | (2006.01) |
| *F16H 63/34* | (2006.01) |
| *F16H 61/32* | (2006.01) |
| *F16H 63/48* | (2006.01) |

(52) U.S. Cl.
CPC ........... *F16H 61/682* (2013.01); *F16H 63/18* (2013.01); *F16H 63/3441* (2013.01); *F16H 63/3458* (2013.01); *F16H 61/32* (2013.01); *F16H 63/48* (2013.01)

(58) Field of Classification Search
CPC .......................... F16H 61/682; F16H 63/3441
See application file for complete search history.

(56) References Cited

U.S. PATENT DOCUMENTS

| 3,125,893 A | 3/1964 | Wolf-Dieter et al. |
| 4,843,901 A | 7/1989 | Peterson et al. |

(Continued)

FOREIGN PATENT DOCUMENTS

| CN | 101517280 | 8/2009 |
| EP | 1857716 | 7/2010 |
| EP | 2218946 | 6/2011 |

OTHER PUBLICATIONS

State Intellectual Property Office of China, "Office Action", "from Foreign Counterpart of U.S. Appl. No. 14/281,649", dated Mar. 24, 2017, pp. 16, Published in: CN.

(Continued)

*Primary Examiner* — Derek D Knight
(74) *Attorney, Agent, or Firm* — Fogg & Powers LLC

(57) ABSTRACT

A shift-by-wire transmission system is provided. The system includes a gearbox that is configured and arranged to receive a rotational input and provide a select rotational output. The gearbox includes a plurality of gear assemblies that are operationally coupled together to provide the select rotational output from the rotational input. A shift assembly is operationally coupled to the plurality of gear assemblies of the gearbox to selectively change gearing of gearbox. An electric motor is operationally coupled to the shift assembly to activate the shift assembly to selectively change the gearing of the gearbox. A manual shift override is employed that is coupled between the shift assembly and the electric motor. The manual shift override is configured and arranged to manually disconnect the electric motor from the shift assembly and activate the shift assembly.

21 Claims, 21 Drawing Sheets

Related U.S. Application Data

(60) Provisional application No. 61/825,257, filed on May 20, 2013.

(56) References Cited

U.S. PATENT DOCUMENTS

| | | | |
|---|---|---|---|
| 6,085,607 | A | 7/2000 | Narita et al. |
| 7,137,499 | B2 | 11/2006 | Riefe et al. |
| 8,037,779 | B2 | 10/2011 | Shiozaki |
| 9,062,765 | B2 | 6/2015 | Shiozaki et al. |
| 2003/0221499 | A1 | 12/2003 | Wong |
| 2004/0200683 | A1 | 10/2004 | Amamiya et al. |
| 2004/0220010 | A1 | 11/2004 | Williams |
| 2005/0194964 | A1 | 9/2005 | Okada et al. |
| 2009/0165545 | A1 | 7/2009 | Fujimoto et al. |
| 2010/0000363 | A1 | 1/2010 | Tomoda et al. |
| 2010/0251846 | A1 | 10/2010 | Pick et al. |

OTHER PUBLICATIONS

European Patent Office, "Communication pursuant to Article 94(3) EPC; from EP Application No. 14735712.3; dated Jun. 29, 2017", "from Foreign Counterpart of U.S. Appl. No. 15/336,083", Jun. 29, 2017, pp. 13.
U.S. Patent and Trademark Office, "Notice of Allowance", "U.S. Appl. No. 14/281,649", dated Aug. 11, 2016, pp. 1-20, Published in: US.
U.S. Patent and Trademark Office, "Office Action", "U.S. Appl. No. 14/281,649", dated Apr. 7, 2016, pp. 1-21, Published in: US.
U.S. Patent and Trademark Office, "Notice of Allowance", "U.S. Appl. No. 14/281,703", dated Feb. 12, 2016, pp. 1-15, Published in: US.
U.S. Patent and Trademark Office, "Office Action", "U.S. Appl. No. 14/281,703", dated Oct. 27, 2015, pp. 1-16, Published in: US.
Patent Cooperation Treaty, "International Preliminary Report on Patentability from PCT Application No. PCT/US2014/038655 dated Nov. 20, 2015", "from Foreign Counterpart of U.S. Appl. No. 14/281,649", dated Nov. 20, 2015, pp. 1-13.
Patent Cooperation Treat, "International Search Report from PCT Application No. PCT/US2014/038655 dated Oct. 27, 2014", "from Foreign Counterpart of U.S. Appl. No. 14/281,649", dated Nov. 27, 2016, pp. 1-4.
Patent Cooperation Treaty, "Written Opinion of the International Searching Authority from PCT Application No. PCT/US2014/038655 dated Nov. 20, 2015", "from Foreign Counterpart of U.S. Appl. No. 14/281,649", dated Nov. 20, 2015, pp. 1-5.
Patent Cooperation Treaty, "International Preliminary Report on Patentability from PCT Application No. PCT/US2014/038662 dated Nov. 20, 2015", "from Foreign Counterpart of U.S. Appl. No. 14/281,703", dated Nov. 20, 2015, p. (s) 1-14.
Patent Cooperation Treaty, "International Search Report from PCT Application No. PCT/US2014/038662 dated Nov. 27, 2014", "from Foreign Counterpart of U.S. Appl. No. 14/281,703", dated Nov. 27, 2014, pp. 1-4.
Patent Cooperation Treat, "Written Opinion of the International Searching Authority from PCT Application No. PCT/US2014/038662 dated Nov. 20, 2015", "from Foreign Counterpart of U.S. Appl. No. 14/281,703", dated Nov. 20, 2015, pp. 1-5.
European Patent Office, "Communication under Rule 71(3) from EP Application No. 14735712.3 dated Jan. 2, 2018", from Foreign Counterpart to U.S. Appl. No. 14/281,649, dated Jan. 2, 2018, pp. 1-53, Published in: EP.
European Patent Office, "Communication pursuant to Article 94(3) EPC; from EP Application No. 14735712.3; dated Jun. 29, 2017", "from Foreign Counterpart of U.S. Appl. No. 15/336,083", dated Jun. 29, 2017, pp. 1-3.

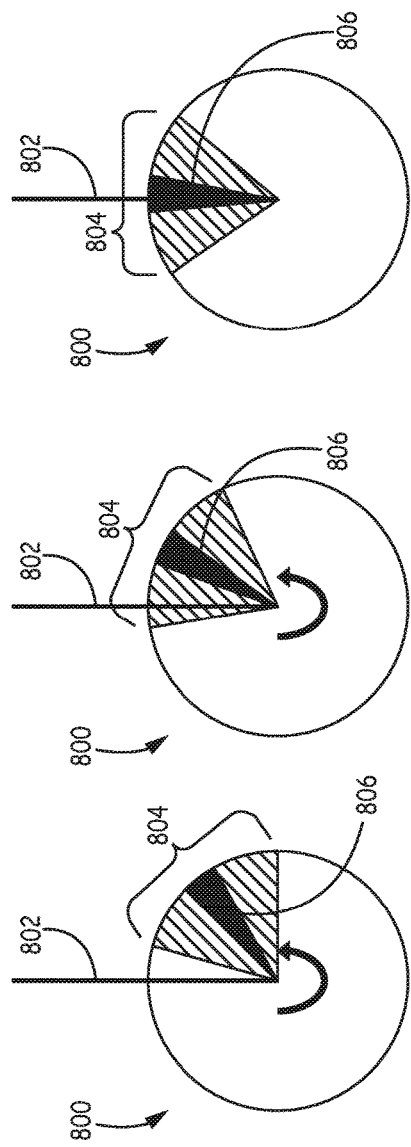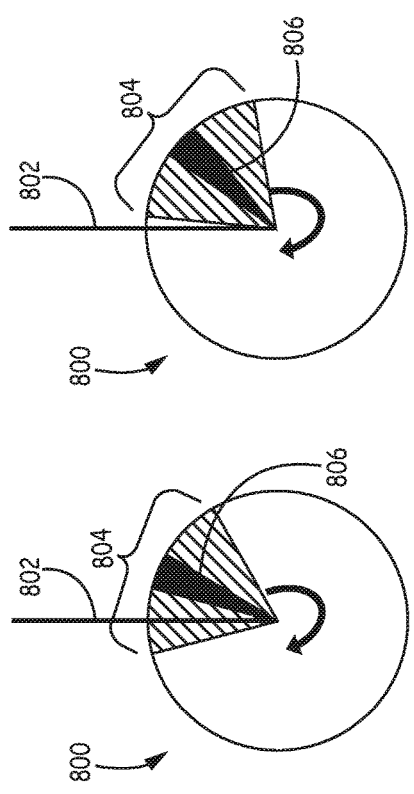

SHIFT DRUM ASSEMBLY OF A TRANSMISSION

CROSS-REFERENCE TO RELATED APPLICATIONS

This application is a continuation of U.S. Pat. No. 9,528,603, entitled "SHIFT-BY-WIRE TRANSMISSION", issued on Dec. 27, 2016, which claims the benefit and priority to U.S. Provisional Application Ser. No. 61/825,257, entitled "SHIFT-BY-WIRE CVT", filed on May 20, 2013, which is incorporated in its entirety herein by reference.

BACKGROUND

Traditionally the changing of gears in a gearbox of a vehicle is done by mechanical linkage. Shift-by-wire systems have been developed in which transmission modes are engaged/changed in an automobile without any mechanical linkage. However, current shift-by-wire designs do not lend themselves well to all-terrain/utility task vehicles (ATV/UTV) and the like. These types of vehicles are subject to harsh conditions and are used in remote locations. If a shift-by-wire transmission fails in gear at a remote location, the design in current shift-by-wire transmissions or transfer cases used in the auto industry would need to be torn apart to disengage or place the transmission into neutral before the vehicle could be moved.

For the reasons stated above and for other reasons stated below which will become apparent to those skilled in the art upon reading and understanding the present specification, there is a need in the art for a shift-by-wire transmission that lends itself to ATV/UTV vehicles.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a shift drum assembly for a gear box of a transmission is provided. The shift drum assembly includes a shift drum housing, a shift cam and a bias member. The shift drum housing has at least one groove guide with a select profile that is configured to receive at least one shift fork positioning pin of a shift fork. The shift drum housing further has a window. The shift cam is rotationally coupled to the shift drum. The shift cam has a shift cam tab that is positioned within the window of the shift drum. The bias member is configured to bias the shift cam in relation to the shift drum to create a preload force used at least in part to complete a shift when a blocked shift condition of the gear box is encountered.

In another embodiment, a transmission is provided. The transmission includes a plurality of gearing assemblies, at least one shift for, a shift drum housing, a shift cam and a bias member. The plurality of gearing assemblies are operationally coupled together to provide a select rotational output from a rotational input of an input shaft to the transmission. The at least one shift fork is configured and arranged to change gearing of the gearing assembly. The shift drum housing forms at least a portion of at least one groove guide. The at least one groove guide has a select profile that includes a ramp section. The at least one groove guide is configured and arranged to receive at least one shift fork positioning pin of the at least one shift fork. The shift drum housing further has a window. The shift cam is rotationally coupled to the shift drum. The shift cam has a shift cam tab positioned within the window of the shift drum. The bias member is configured to bias the shift cam in relation to the shift drum to create a preload force used at least in part to complete a shift when a blocked shift condition of a gear box of the transmission is encountered.

A transmission system for a vehicle implementing a gearbox with shift dogs is provided. The transmission system includes an input shaft, a plurality of gearing assemblies, at least one shift fork, a shift drum, a shift cam and a bias member. The plurality of gearing assemblies are operationally coupled together to provide a select rotational output from a rotational input of the input shaft. The at least one shift fork is configured and arranged change gearing of the gearing assembly. The shift drum housing has a window. The shift cam is rotationally coupled to the shift drum and forms, with the shift drum, at least one groove guide with a select profile that is configured to receive at least one shift fork positioning pin of the at least one shift fork. The shift cam has a shift cam tab positioned within the window of the shift drum. The bias member is configured to bias the shift cam in relation to the shift drum to create a preload force used at least in part to complete a shift when a blocked shift condition of the gear box is encountered.

BRIEF DESCRIPTION OF THE DRAWINGS

The present invention can be more easily understood and further advantages and uses thereof will be more readily apparent, when considered in view of the detailed description and the following figures in which:

FIGS. 15A through 15E are target window pie charts illustrating the shifting operations of one embodiment of the present invention.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a gearbox that shifts gear ranges via an electric shift motor that is controlled by an electric signal from an operator input device rather than a mechanical linkage. In embodiments, a manual-mechanical override is provided in case of electrical power failure or failure of the electric shift motor. Moreover, in embodiments, a spring loaded cam mechanism is provided for park gear. Embodiments also provide a hybrid transmission system that controls both gear ranges (high/low) as well as direction (forward/reverse). This hybrid configuration makes split control of range and direction possible. Embodiments also provide an auto shift to park at a vehicle power down. In addition, some embodiments provide a motor control algorithm that acts as an electronic detent to maintain proper position while at the same time preventing unwanted motor starts/stops.

Figure 1:
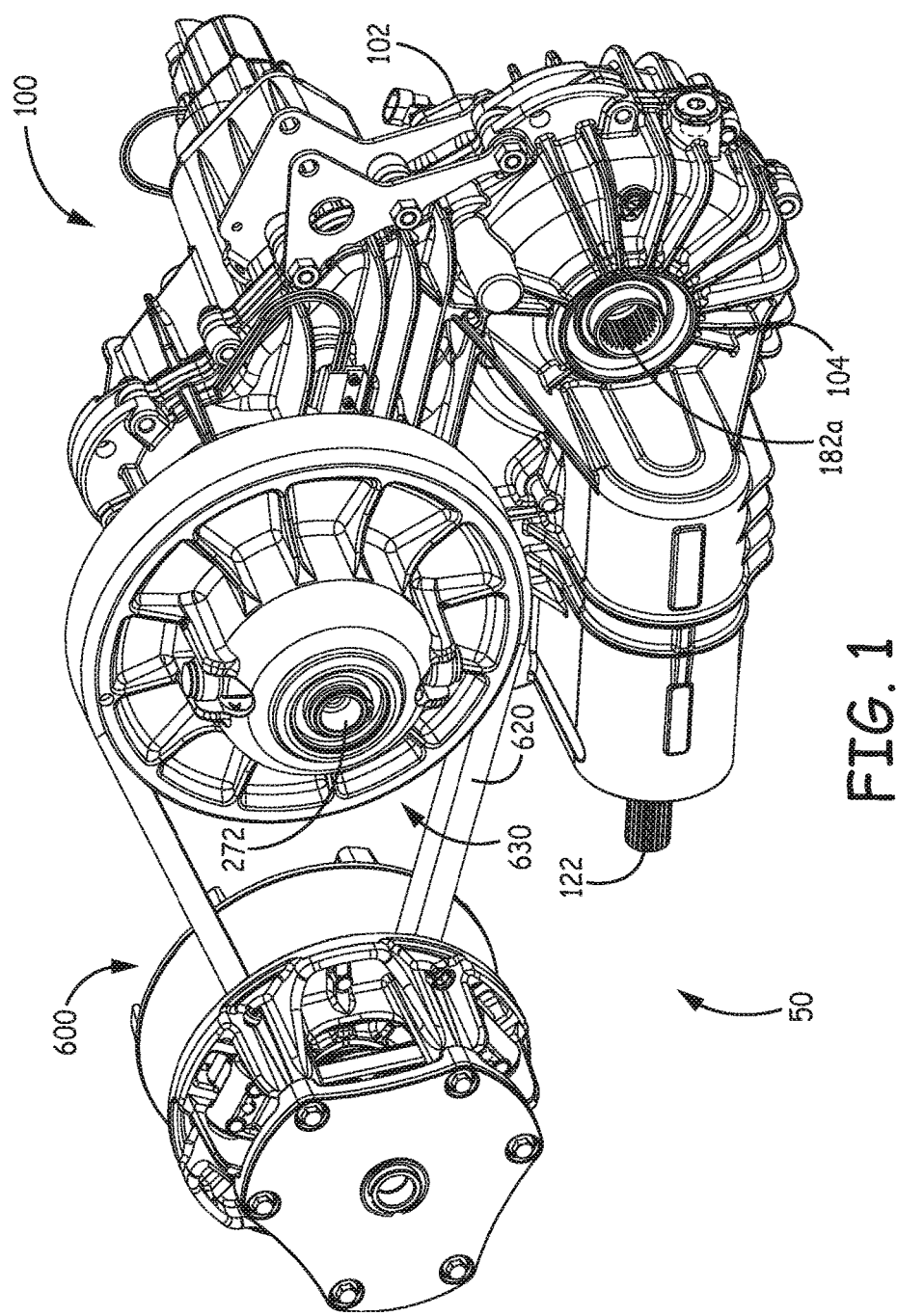
FIG. 1 is a side perspective view of a continuous variable transmission (CVT) system of one embodiment of the present application.
Figure 2:
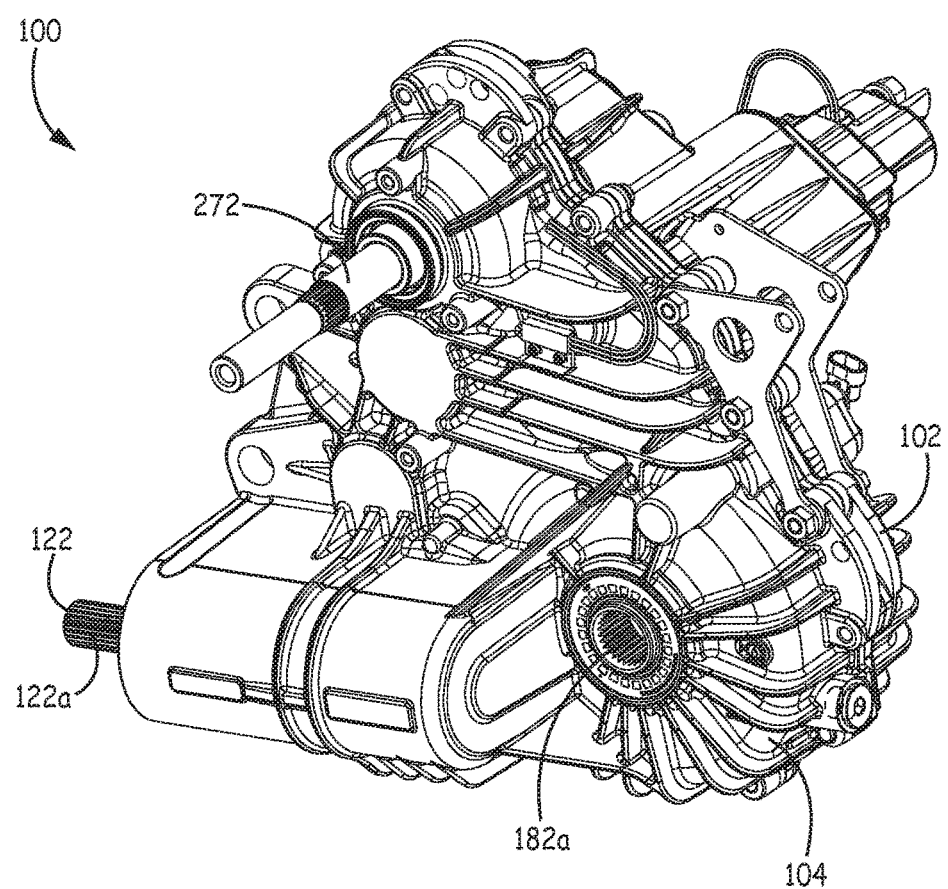
FIG. 2 is a first side perspective view of a gearbox of the CVT system of FIG. 1.
Figure 3:
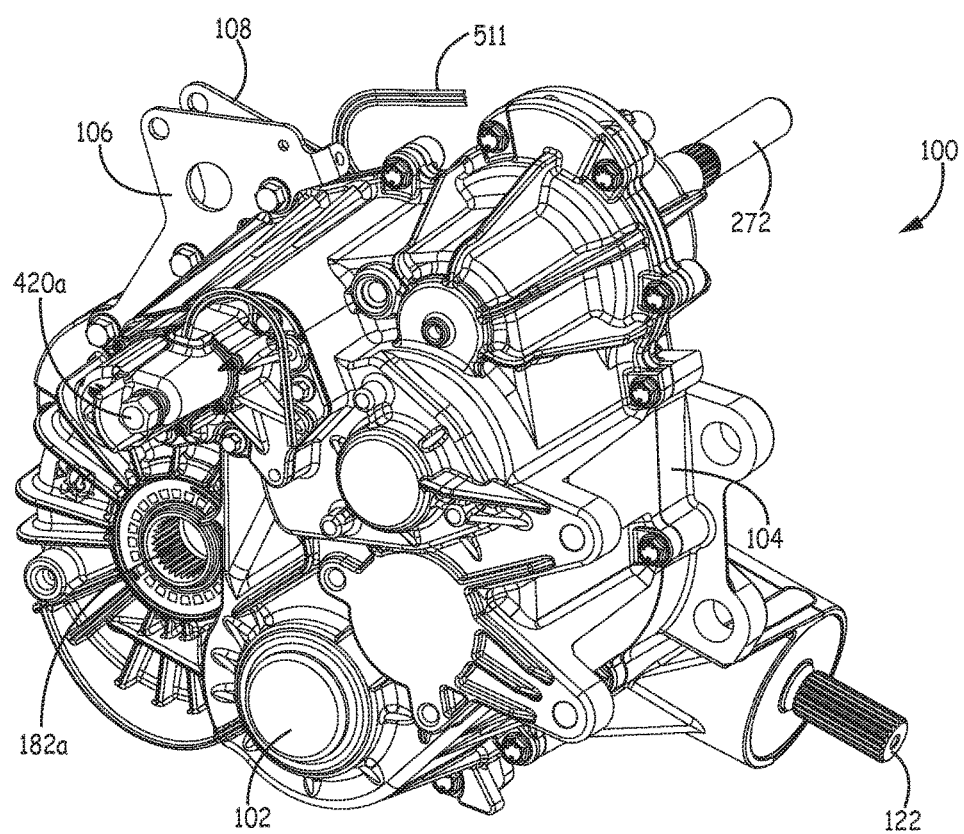
FIG. 3 is a second side perspective view of the gearbox of FIG. 2.

Referring to FIG. 1 a first side perspective view of a continuous variable transmission (CVT) system 50 that implements a shift-by-wire embodiment of the present application is shown. The example CVT system 50 includes a primary clutch 600 that would be coupled to the crankshaft of a motor (not shown), a second clutch 630 that is coupled to an input shaft 272 of a shift-by-wire gearbox assembly 100 (gearbox 100) and a belt 620 that transfers rotation of the primary clutch 600 to the secondary clutch 630. As known in the art, each of the primary and secondary clutches 600 and 630 have movable sheaves that selectively position the belt 620 select distances from respective center posts to set a then current gear. FIG. 2 illustrates a first side perspective view of the gearbox 100 without the primary and secondary clutches 600 and 630. The gearbox 100 includes a first housing section 102 and a second housing section 104. Also illustrated in FIG. 2 is the input shaft 272 in which the secondary clutch 630 is coupled to provide input rotation. Also illustrated is a front output shaft 122 with spines 122a upon which an assembly is coupled to provide a rotational force to the front wheels of a typical four wheel drive vehicle (not shown). FIG. 2 further illustrates splined bore 182a. The splined bore 182a is used to convey rotation to rear wheels of the vehicle (not shown). FIG. 3 illustrates a second side perspective view of the gearbox 100. Illustrated in this view is manual shift override activation head 420a which is selectively rotated to override an electronic shift-by wire configuration. This is further discussed below in detail.

Figure 4A:
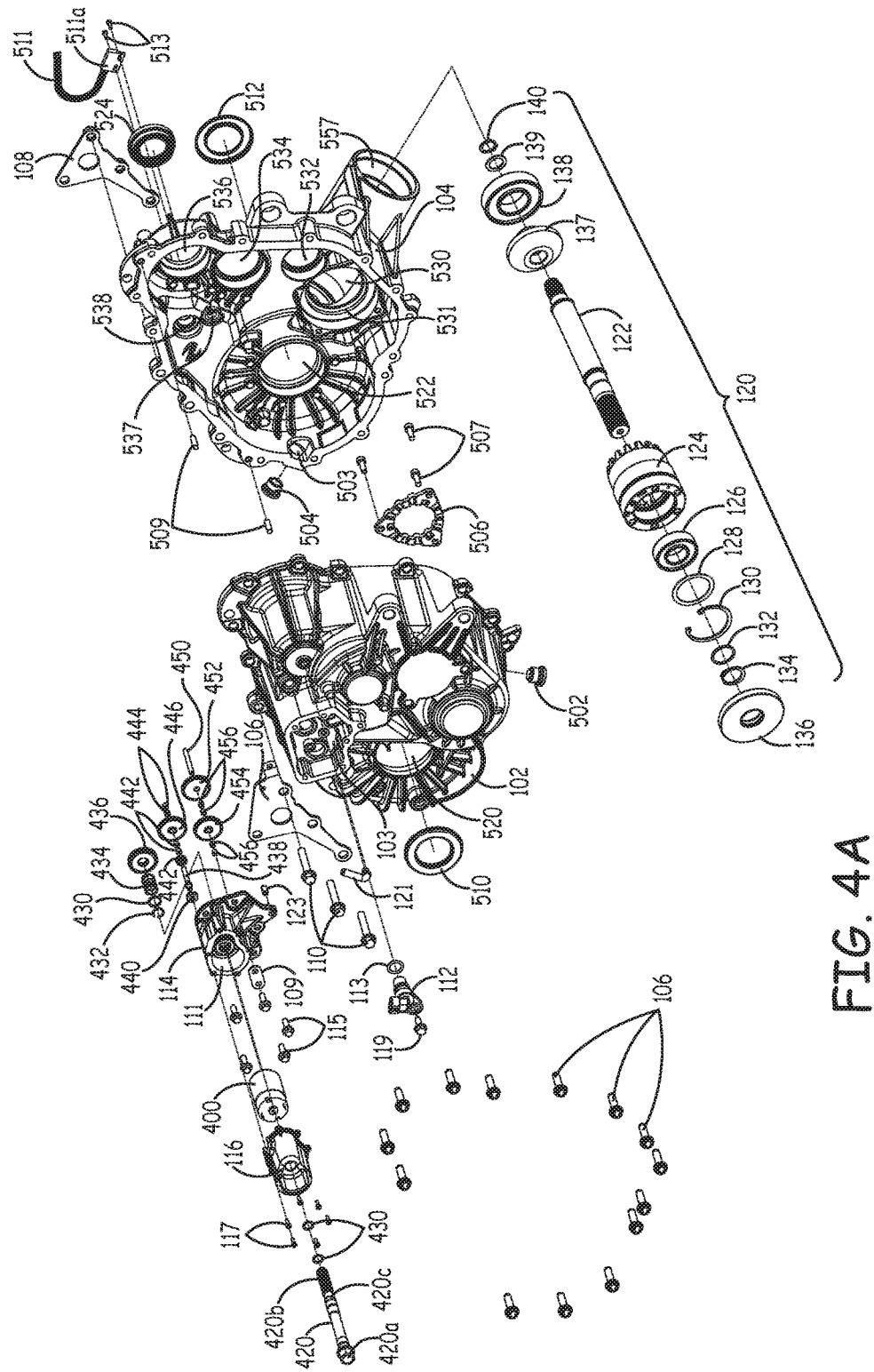
FIG. 4A is a partial first side perspective view of the gearbox of FIG. 2 unassembled.
Figure 4B:
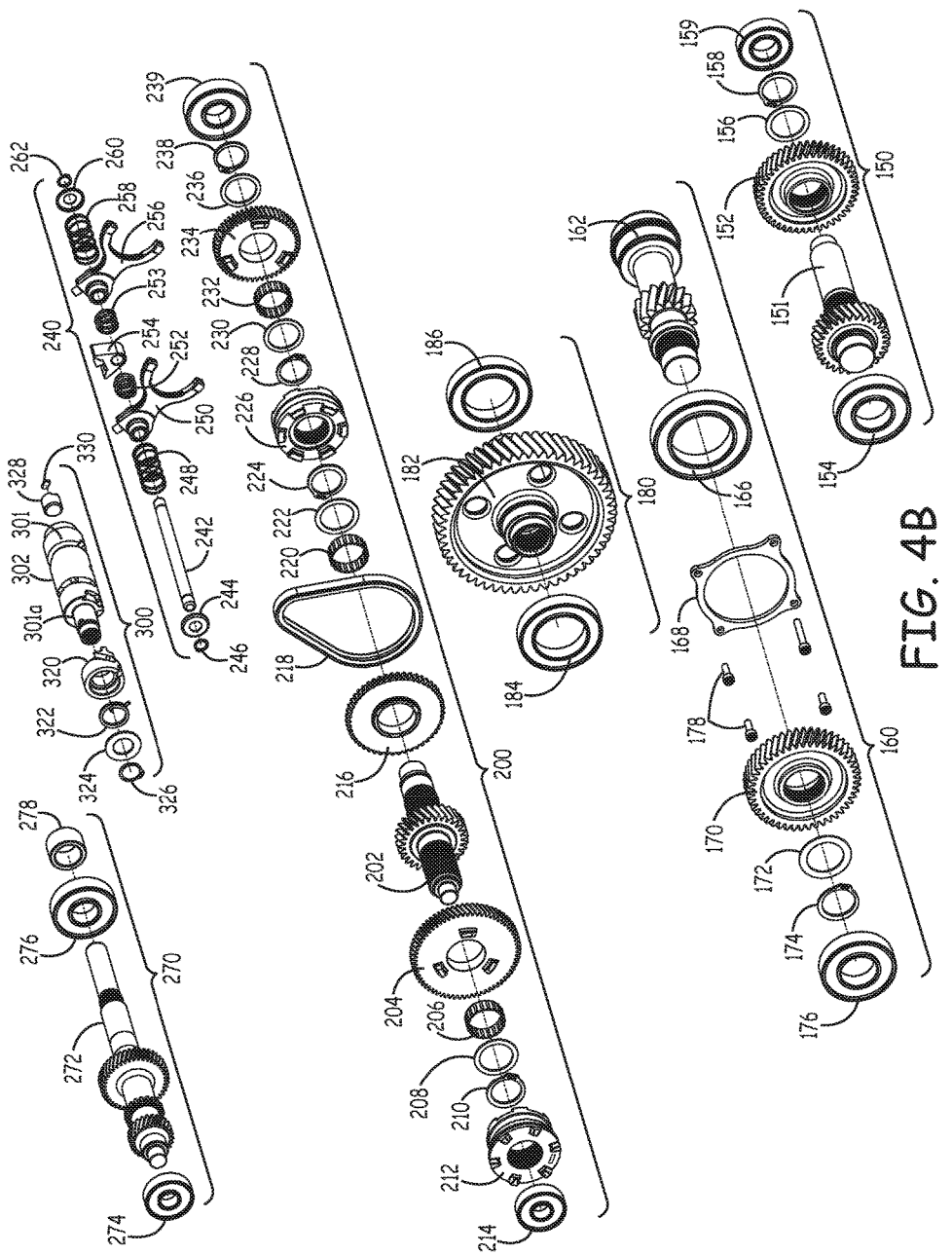
FIG. 4B is a partial second side view of the unassembled gearbox illustrating the remaining elements to FIG. 4A.

An unassembled view of the gearbox 100 of one embodiment is illustrated in FIGS. 4A and 4B. As discussed above, the gearbox 100 includes a first housing section 102 and a second housing section 104 that make up the housing of the gearbox 100. The first housing section 102 is coupled to the second housing section 104 via fasteners 106. Aligning pins 509 are used to align the first housing section 102 to the second housing section 104 during attachment. The gearbox 100 includes a plurality of gearing assemblies that are housed within the housing. In particular, the gearing assemblies include a front output assembly 120, a second shaft assembly 200, a third shaft assembly 150, a fourth shaft assembly 160, a rear output assembly 180, a shift fork assembly 240, an input assembly 270 and a shift assembly 300. The shift assembly 300 in this embodiment is a shift drum assembly 300. The housing sections 102 and 104 are designed to hold the gearing assemblies in select locations in relation to each other. For example, housing 104 includes receiving tube 557 to receive the front output assembly 120. Housing 104 also includes a first gear aperture 530 that extends into the receiving tube 557. A shaft 162 of the fourth shaft assembly 160 is received within the first gear aperture 530 and is in operational communication with the output assembly 120. Housing 104 also includes an idler seat 532 to hold a ball bearing 159 of the third shaft assembly 150. Housing 104 further includes a main seat 534 to hold a ball bearing 239 of the second shaft assembly 200. Housing 104 includes an input aperture 536. An input shaft 272 of the input assembly 270 extends through the input aperture 536. A seal 524 is received within the input aperture 536. Housing 104 also includes a rear output assembly aperture 522. Bearing 186 of the rear output assembly 180 and seal 512 are received in the rear output assembly aperture 522. Housing section 104 also includes a shift fork seat 537 to hold an end of the shift fork assembly 240 and a shift drum seat 538 to hold an end of the shift drum assembly 300. The first housing 102 has similar features to hold the gearing assemblies in position so they can operationally communicate with each other. For example, the first housing assembly 102 also includes a rear output assembly aperture 520 to receive a bearing 184 of the rear output assembly 180 and a seal 510.

The output assembly 120 includes, a front output shaft 122 upon which a bearing carrier 124, gear 137, ball bearings 126, 138, washer 139, retaining rings 134, 140, shims 128 and 132, retaining ring 130 and lip seal 136 are mounted. The third shaft assembly 150 includes a third shaft 151 upon which a gear 152, washer 156, retaining ring 158 and ball bearings 154 and 159 are mounted. The fourth shaft assembly 160 includes fourth shaft 162 upon which is mounted ball bearings 166 and 176, retaining ring 174, gear 170 and washer 172. Also included with the fourth shaft assembly 160 is a bearing cover 168 that is received on the fourth shaft 162 and is designed to be attached to an inside surface of the second housing section 104 via fasteners 178 to cover bearing 166. Bearing 166 is received in a bearing seat 531 around the first gear aperture 530 in the inside surface of the housing section 104. The rear output assembly 180 includes gear 182. Bearings 184 and 186 are mounted on opposite sides of a center post of gear 182. Bearings 184 and 186 are received in seats around the second gear assembly aperture 522 and second gear assembly aperture 520 of the respective housing sections 102 and 104. The second shaft assembly 200 includes a second shaft 202 upon which is mounted a low gear 204, needle bearings 206, 220 and 232, washers 208, 222, 230 and 236, retaining rings 210, 224, 228 and 238, park shift dog 212, ball bearings 214 and 239, sprocket 216 with chain 218, engagement dog 226 and gear 234. The shift fork assembly 240 includes shift fork rail 242 upon which is mounted a pair of shift forks 250 and 256 that engage the respective park shift dog 212 and engagement dog 226 of the second shaft assembly 200. Also mounted on the shift fork rail 242 are retaining rings 246 and 262, cup washers 244 and 260, compression springs 248, 252, 253, and 258, and shift collar 254. The input assembly 270 of this embodiment includes an input shaft 272 upon which bearings 274 and 276, and sleeve collar 278 are mounted. The shift drum assembly 300 includes a shift drum 302. The shift drum 302 includes a shift drum housing 301 with a shift drum post 301a upon which a spring loaded shift cam 320 with shift cam spring 322, retaining ring 326 and a washer 324 are mounted. The shift drum assembly 300 in this embodiment includes an angular position sensor to determine the angular position of the shift drum 302 (setting of the shift drum 302). Moreover, in this example embodiment, a Hall effect position sensor assembly is used. In particular, mounted to an end of the shift drum is a non-ferrous bushing 328 that holds a magnet 330. A Hall effect rotary position sensor 511a, as illustrated in FIG. 4A, is mounted proximate the magnet 330. The Hall effect rotary position sensor is mounted in this embodiment via fasteners 513. Sensor wires 511 are coupled to a controller, discussed below, to monitor the angular orientation of shift drum housing 301 (i.e. the setting of the shift assembly). Although, a Hall effect position sensor is shown, other types of position sensors known in art can be used. Moreover, although the magnet 330 in the Hall effect type system described above is mounted on the bushing 328, other configurations such as, but not limited to, integrating the magnet internally within the shift drum housing 301, mounting the magnet on the shift drum housing 301, and implementing the magnet in a rotor configuration such that as the drum housing 301 rotates, the rotor rotates are contemplated. A detailed discussion of the shift drum assembly is provided below.

Referring to FIG. 4A, a first rear mount bracket 106 is mounted on the first housing section 102 and a second rear mount bracket 108 is mounted on the second housing section 104 via fasteners 110. The gearbox 100 includes a speed sensor 112 that is operationally coupled to monitor the assemblies of the gearbox to determine a speed. The speed sensor 112 is coupled to the first housing section in this embodiment via o-ring 113 and fastener 119 configuration. A vent tube 121 is used to vent the housing. The first housing section 102 further includes an outer cavity 103 that houses a gear train 431 discussed below. A first motor cover 114 is designed to cover the outer cavity 103 via fasteners 115. An alignment pin 123 is used to align the first motor cover 114 in relation to the first housing section 102 to cover the outer cavity 103. The first motor cover 114 includes a motor cavity 111 in which an electric motor 400 is received. A wire harness bracket 109 is coupled to the first motor cover 114. A second motor cover 116 is then coupled to cover motor cavity 111 via fasteners 117. A manual shift override member 420 passes through apertures in the second motor cover 116, the first motor cover 114 and the first housing section 102 to engage the shift drum assembly 300. The manual shift override member 420 includes a manipulation head portion 420a that is configured to be manipulated to override an electric shifting mechanism as further discussed below in detail. The manual shift override member 420 further includes external splines 420b proximate a second end and a release section 420c that is proximate the external splines 420b.

The release section 420c of the manual shift override member 420 has a diameter that is less than the diameter of the external splines 420b section. Further mounted on the manual shift override member 420 are washers 430, retaining ring 432, override biasing member 434 and a decoupleable shift gear 436. Positioned within the outer cavity 103 is a first gear train shaft 438 upon which a seal 440, bearings 444 and a first gear 442 and a second gear 446 are mounted. The first gear train shaft 438 is coupled to the motor 400. Also positioned within the outer cavity 103 is a second gear train shaft 450 upon which is mounted a third gear 452, a fourth gear 454 and respective bearings 456. Also shown in FIG. 4A is plug 502 that threadably blocks an output port (not shown) in the first housing section 102 and plug 504 that threadably blocks an output port 503 in the second housing section 104. Moreover, a park plate 506 is coupled to the first housing section 102 via fasteners 507.

Figure 5A:
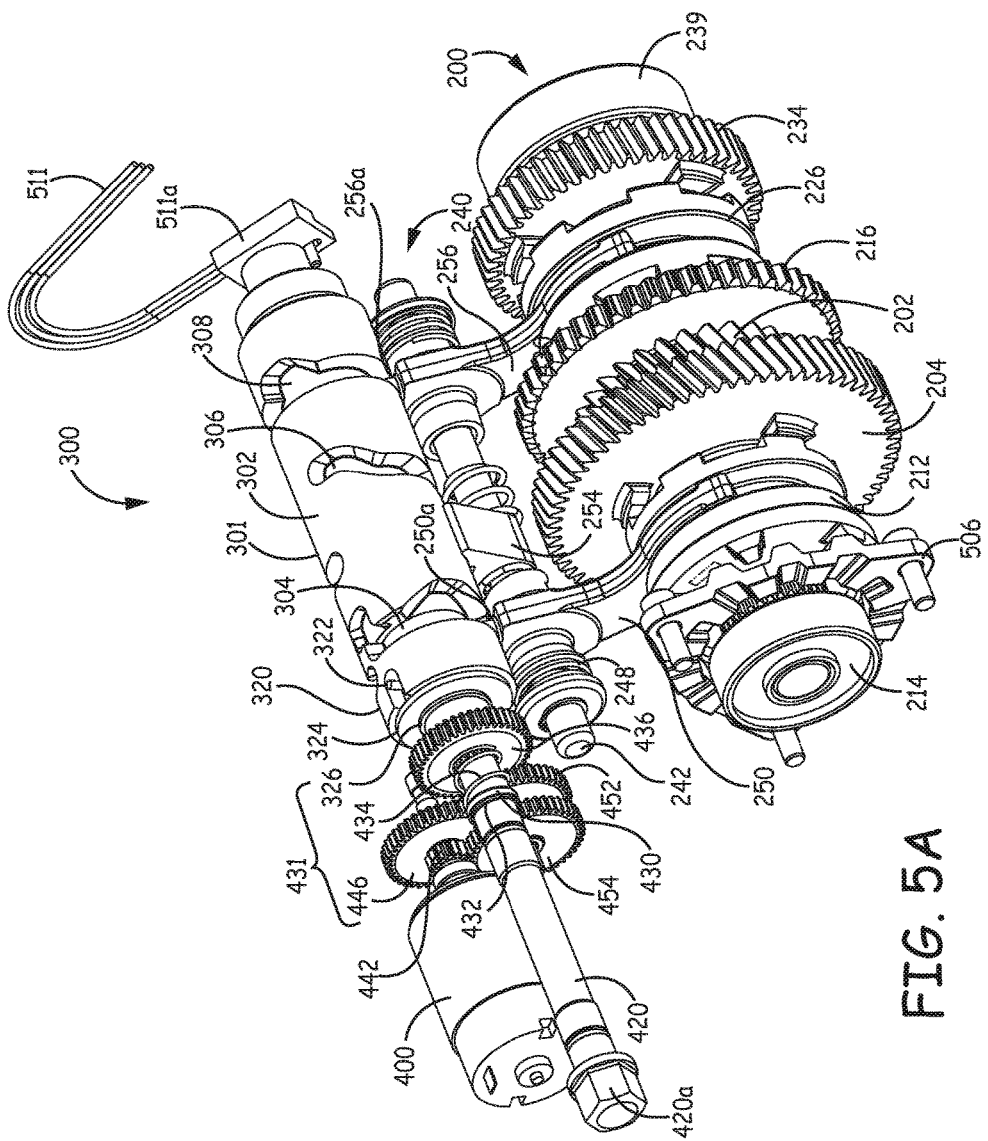
FIG. 5A is a first side perspective view of the shift-by-wire components of the gearbox of an embodiment of the present invention.
Figure 5B:
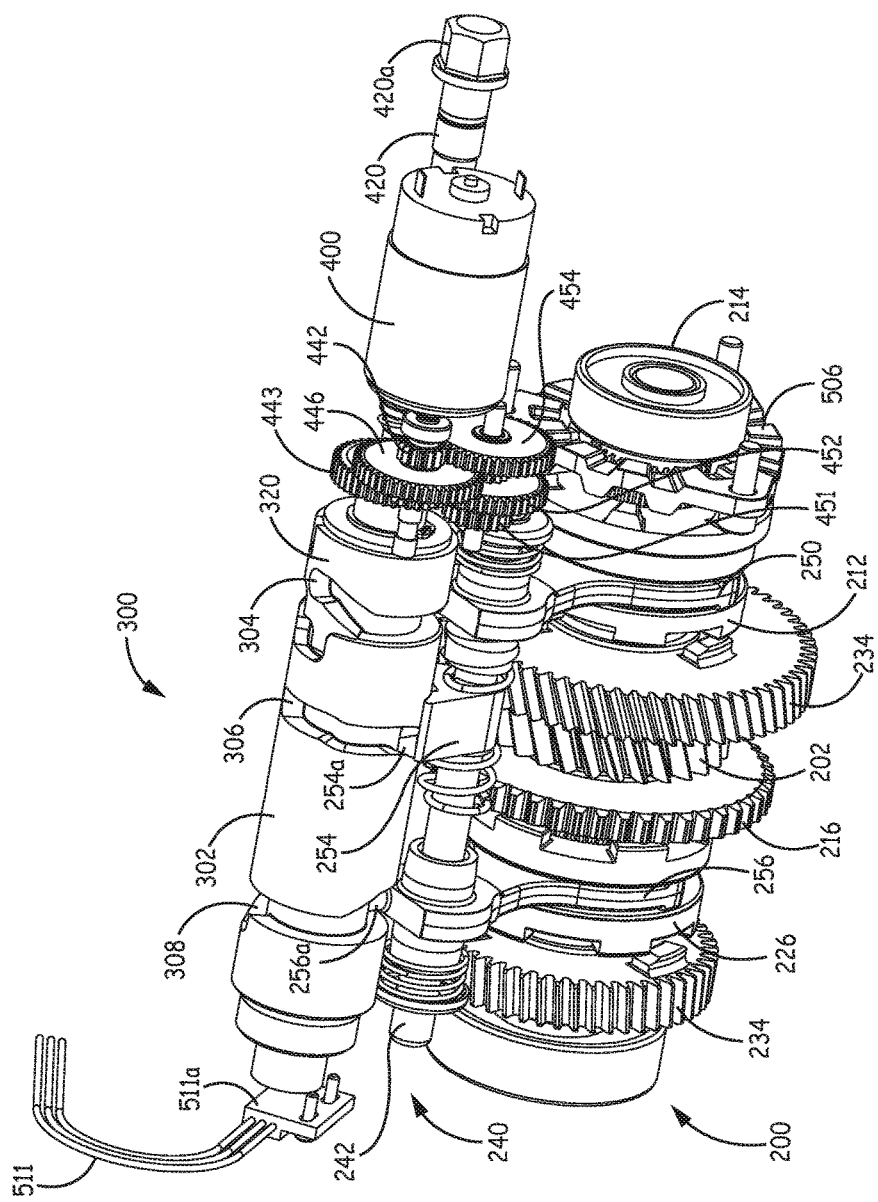
FIG. 5B is a second side view of the shift-by-wire components of FIG. 5A.

FIGS. 5A and 5B illustrate first and second side perspective views of the shift-by-wire components of the gearbox 100 without the housing. The components include the shift drum assembly 300, the shift motor 400, the manual shift override member 420, the shift fork assembly 240 and the second shaft assembly 200. The FIGS. 5A and 5B illustrates how the assemblies are in working communication with each other. The shift drum assembly 300 includes a shift drum 302 with a housing 301. An end surface of the spring-loaded shift cam 320 and an end surface of the housing 301 form a first shift fork groove 304 (or park shift fork groove 304) in which a shift fork positioning pin 250a of the first shift fork 250 (or park shift fork 250) is received. The housing 301 further has a shift collar groove 306 in which a shift collar positioning portion 254a of the shift collar 254 is received. The shift drum housing 301 further includes a second shift fork groove 308 in which a shift fork positioning pin 256a of the second shift fork 256 is received. The shape of each of the grooves 304, 306 and 208 (or generally groove guides) are shaped to selectively move the respective first shift fork 250, shift collar 254 and second shift fork 256 to a desired location to change the gearing of the gearbox 100 when the shift drum assembly 300 is rotated. That is, the shift forks 250 and 256 and respective dog clutches 212 and 226 are moved by the shift drum 302.

A shift drum gear train 431 is used to rotate the shift drum 302. The shift drum gear train 431 includes gears 442, 446, 454, 452 and 436 as discussed above. In normal operation, the motor 400 which is in operational communication with the shift drum gear train 431 rotates the shift drum 302 to selectively move the shift forks 250 and 256 and the shift collar 254 of the second shaft assembly 200 to change gears of the gearbox 100. In embodiments, the manual shift override member 420 is configured to override the motor 400 when needed. In embodiments, the spring coupled mechanism described above is used not only for park gears but for all gears of the gearbox assembly 100.

Figure 5C:
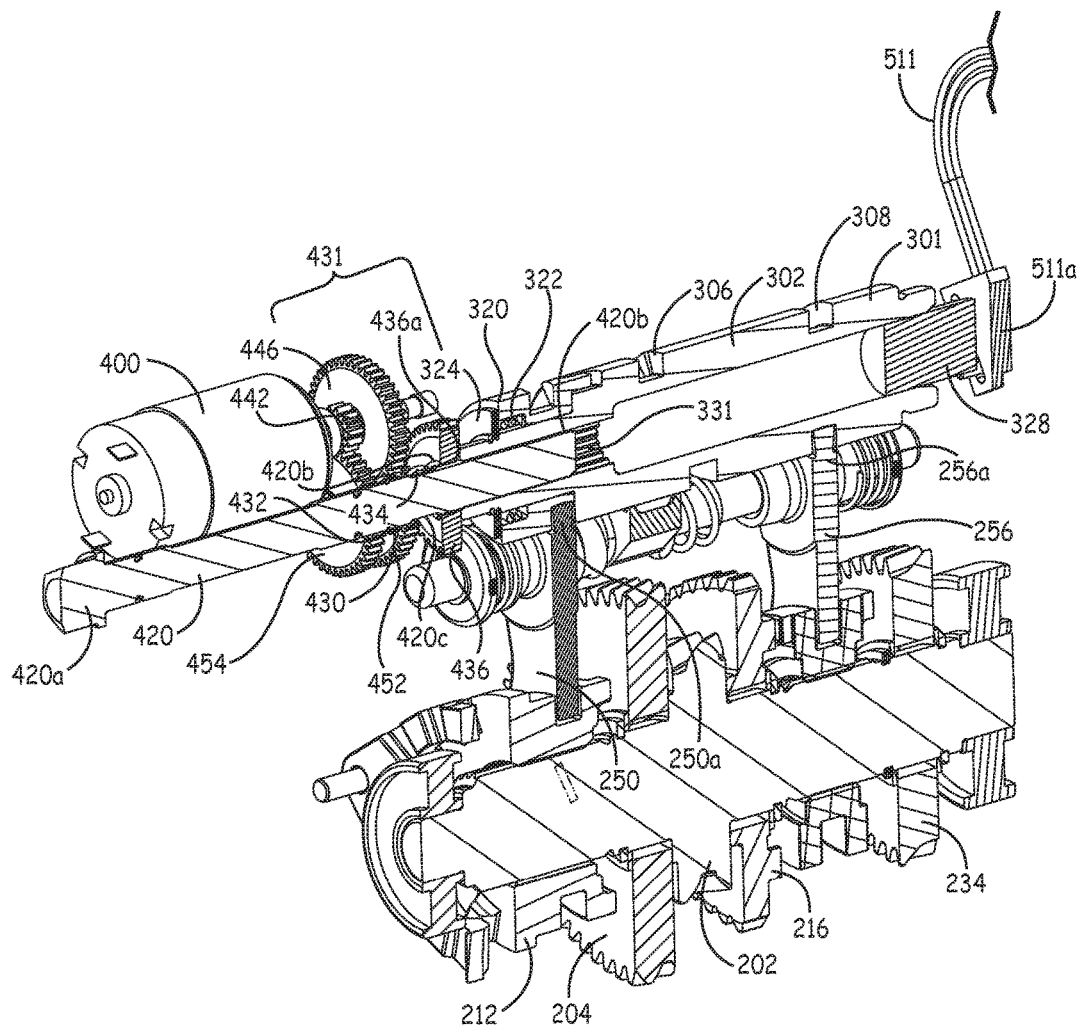
FIG. 5C is a partial cross-sectional side view of the shift-by-wire components illustrated in FIG. 5A.
Figure 6:
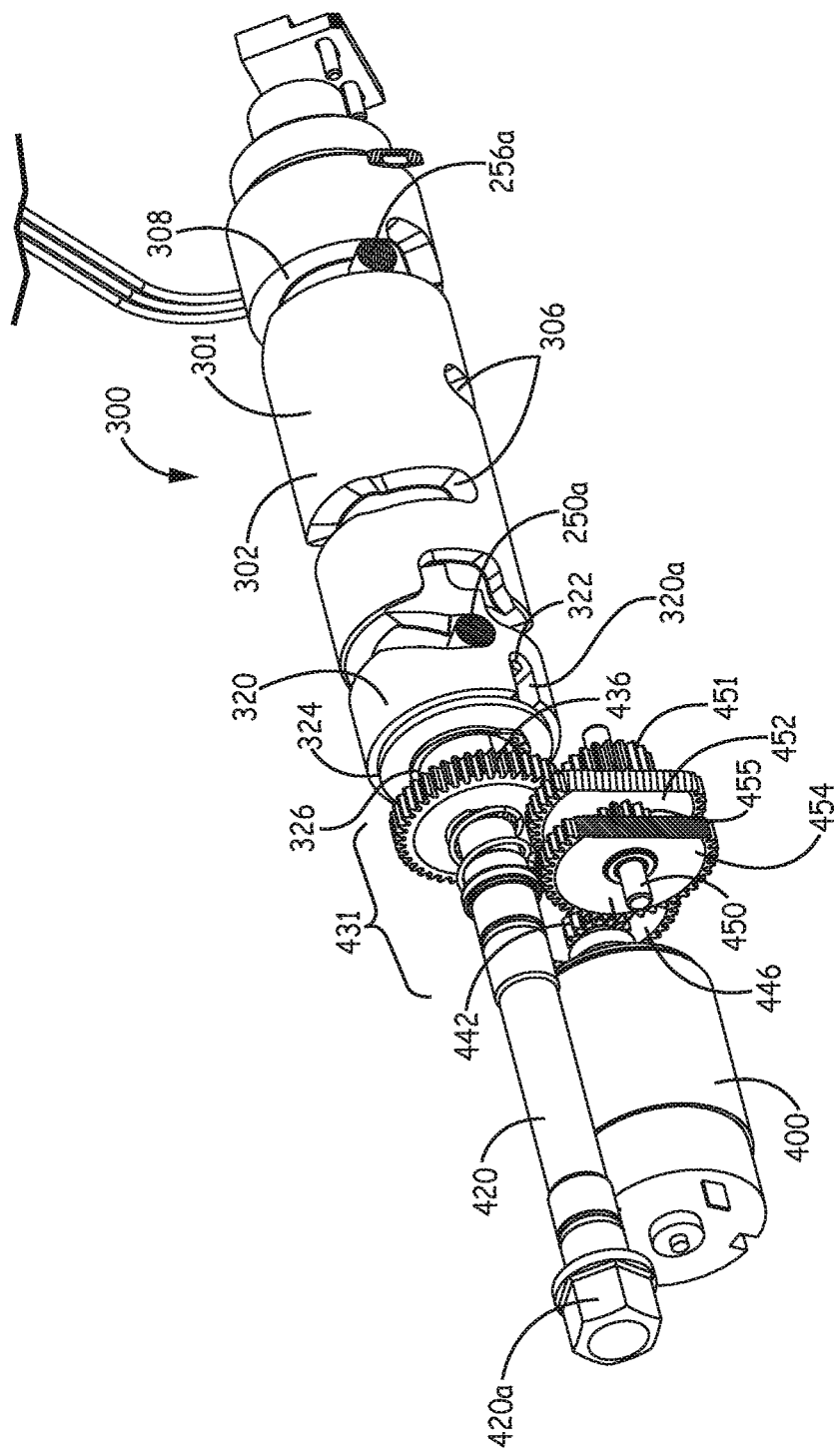
FIG. 6 is side perspective view with a partial cross-sectional view of a gear train of shift-by-wire components of one embodiment of the present invention.

FIG. 5C illustrates a cross-sectional view of FIG. 5A. This cross-sectional view illustrates that the shift drum housing 301 includes interior splines 331 that engage the exterior splines 420*b* on the manual shift override member 420. This connection locks rotation of the manual shift override member 420 to the rotation of the shift drum 302. Decoupleable shift gear 436 is selectively coupled to the manual shift override member 420 via the exterior splines 420*b*. In particular, the decoupleable shift gear 436 includes interior gear splines 436*a* that selectively engage the exterior gear splines 420*b* on the manual shift override member 420. The biasing member 434 positioned between washer 430/retaining ring 432 and the decoupleable shift gear 436 (best shown in FIG. 5C) biases the decoupleable shift gear 436 to engage the exterior splines 420*b* of the manual shift override member 420. As the partial cross-sectional view of FIG. 6 illustrates, the decoupleable shift gear 436 engages gear 451. Gear 451 is also part of the gear train 431. Also illustrated in FIG. 6 is gear 455 positioned between gears 454 and 452 on the second gear train shaft 450. Gear 446 rides on the first gear train shaft 438 via bushing 444. Gear 442 is coupled to the first gear train shaft 438. Gears 442 and 446 engage gears 454 and 455, respectively of the second gear train shaft 450. In one embodiment, gears 455 and 454 are cluster gears that are operationally coupled together. Similarly, 452 and 451 can be cluster gears operationally coupled together. When the motor 400 is activated the gear train 431 moves the decoupleable shift gear 436 that is coupled to the manual shift override member 420 that is in turn rotationally locked to the shift drum 302. If a manual override of shifting of the gearbox 100 is needed, the manipulation head 420*a* of the manual shift override member 420 is pushed into the shift drum housing 301 countering the bias force of bias member 434. This disengages the interior gear splines 436*a* of the decoupleable shift gear 436 from the exterior gear splines 420*b* of the manual shift override member 240 and positions the decoupleable shift gear 436 in the release section 420*c* (best shown in FIG. 5C) of the manual shift override member 240. This disengages the gear train 431 from the manual shift override member 420. The manual shift override 420 can then be rotated to rotate the shift drum 302 to a desired orientation to change the gearing of the gearbox 100.

Embodiments of the shift-by-wire system use a small low weight and low cost electric motor that provides a quick shift cycle time. Moreover, a relatively high rpm motor with a large speed reduction gear ratio is used to achieve an appropriate rpm at the shift drum. A combination of the gear ratio, efficiency loss within the gear train and the torque needed to spin the motor's shaft 438, makes it difficult, if not impossible, to backdrive the system from the shift drum mechanism without disconnecting the motor 400 from the shift drum 300 as described above. Hence, without the manual override system, if the vehicle loses electrical power the operator will be stuck in whatever gear the gearbox 100 was in at the time of the loss of electrical power. If the vehicle was in "Park" the vehicle would not be able to be towed because the wheels would be locked by the gearbox 100. In a traditional shift-by-wire system the transmission would have to be disassembled in order to manually shift gears by rotating the shift cam system. The manual override mechanism described above allows an operator to disengage the shift drum 302 from the electrical motor 400 and associated gear train 431 to manually shift the gearbox 100.

Another advantage to the configuration of the assemblies 120, 150, 160, 180, 200, 240 and 270 in the gearbox 100 is that it provides a gearbox 100 that not only changes gear ratios it also changes both gear range (high/low) and direction (forward/reverse). Hence the gearbox 100 provides a hybrid of a typical automotive driveline layout where forward gear ratios and direction (forward/reverse) would be changed by the transmission and gear range (High/Low and/or 2wd/4wd) would be changed by the transfer case. Gearbox assemblies typical of a CVT driven driveline in ATV/UTV applications basically function as a transfer case found in automotive car/truck application, but have to incorporate a reverse gear that automotive does not have since they have separate transmission to provide that function.

In embodiments, a park gear locks a gearbox shaft from rotating by operatively connecting to the gearbox housing. This can be done with a dog clutch riding on a shaft that locks to a meeting clutch plate grounded to the housing or via a pawl grounded to the housing that engages the dog clutch on one of the shafts. Due to the nature of dog clutch shifting, there will be times when one shifts to park but the teeth do not line up, preventing the parts from dropping into full mesh. They will sit in a "blocked" or "top" to "top" condition. With purely mechanical shifting, one can utilize a spring-loaded detent to maintain a preload on the shifting mechanism such that as soon as the vehicle rolls a small amount and the teeth spaces lineup, the parts will finish the shift and drop into full mesh. With an electric powered shift mechanism, the motor 400 is trying to rotate the shift cam assembly 300 to specific angular positions for each gear and then shut off. If the dog clutch 212 lands in the blocked condition while shifting into Park with an electric shift configuration, you cannot rely on a spring loaded detent system to finish the shift because that would mean the detent would need to be able to back drive the electric motor gear train once the parts lined up, which due to the ratio, efficiency and motor free will torque, isn't always possible. To finish the shift, an electric motor would need to stay energized to impart steady torque until there is relative motion between the dog clutch teeth to achieve a fully meshed engagement. This is undesirable because it will stall the motor, causing heat and waste electrical draw. Although, it is possible to oversize the motor and associated wiring to dissipate enough heat to prevent a stall, an undesirable cost and weight penalty will be incurred. One embodiment of the present invention utilizes a spring-loaded shift cam 320 that is a separate piece from the shift drum 302 to address this problem. It allows (spring in\direct-couple out) functionality. If a park dog lands in a block condition, the shift motor can rotate the shift drum to its target angular position and shut off. As a shift drum 302 rotates, a torsion spring 322 holds a torsional preload on the shift cam 320 such that shift cam tab 320*a* is held against surface 303*a* with some preload force. As soon as the vehicle rolls slightly, allowing the dog clutches to engage, the shift cam finishes the shift. The direct-couple out feature of the shift cam 320 allows the electric motor 400 to directly move the dog clutch out of engagement without applying the work through a spring. For gearboxes with a plurality of gear ranges, there is typically a limited amount of rotation available at the shift cam mechanism (shift drum). For an electric motor actuated shift drum, to keep the motor size, weight and cost down it is desired to get as much mechanical advantage in the shift drum cam tracks as possible. If you simply spring load the shift cam 320 for both directions (going into and out of gear), one would have to allow for more angular rotation for the park gear position, which would hurt the goal of maximizing rotation versus mechanical advantage. If you shifted out of park and load conditions created friction that tries to hold the park dog clutches in mesh, the torsion spring would need to first wind up until the coil binds, at which point it would act like a solid connection that would then start to move the shift fork\dog clutch out of mesh. Once the shift is complete and the dog clutches are in full engagement, they cannot pop out because the cam tracks block the fork from moving.

Figure 7:
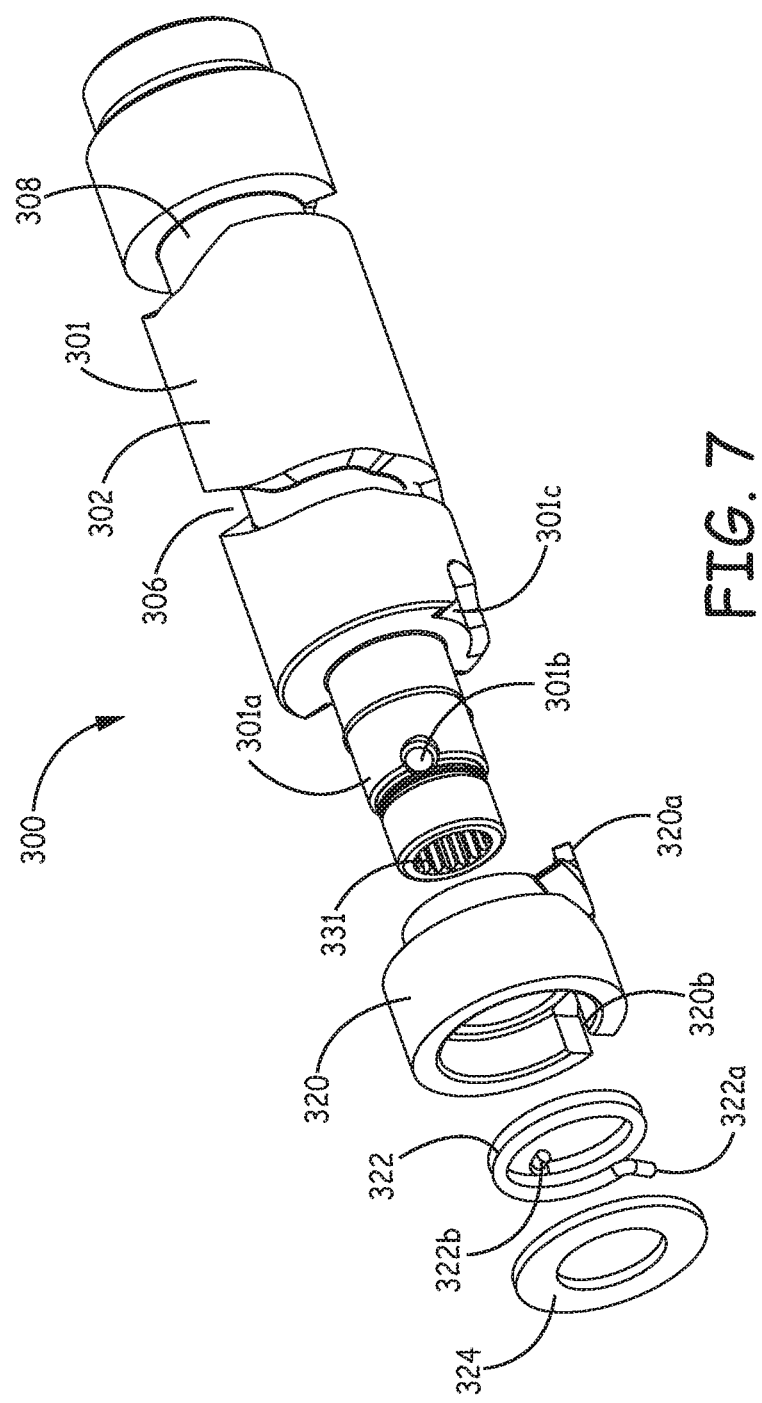
FIG. 7 is an unassembled side view of a shift drum assembly of one embodiment of the present invention.

Referring to FIG. 7, an unassembled side perspective of the shift drum assembly 300 is illustrated. As discussed above and illustrated in FIG. 7, the shift drum assembly 300 includes a shift drum 302 having a shift drum housing 301. The shift drum housing 301 includes a shift drum post 301a. The spring-loaded shift cam 320 is received around the shift drum post 301a. Formed within the shift drum post 301a of the housing 301 is a spring holding aperture 301b. The shift drum housing 301 also includes shift drum window 301c that is positioned proximate the shift drum post 301a. The shift cam 320 includes a shift cam tab 320a which is positioned within the shift drum window 301c in the shift drum housing 301 and a spring holding slot 320b. The shift cam spring 322 includes a first end 322a which is received in the spring holding slot 320b of the shift cam 320 and a second end 322b that is received in the spring holding aperture 301b in the shift drum post 301a.

Figure 8A:
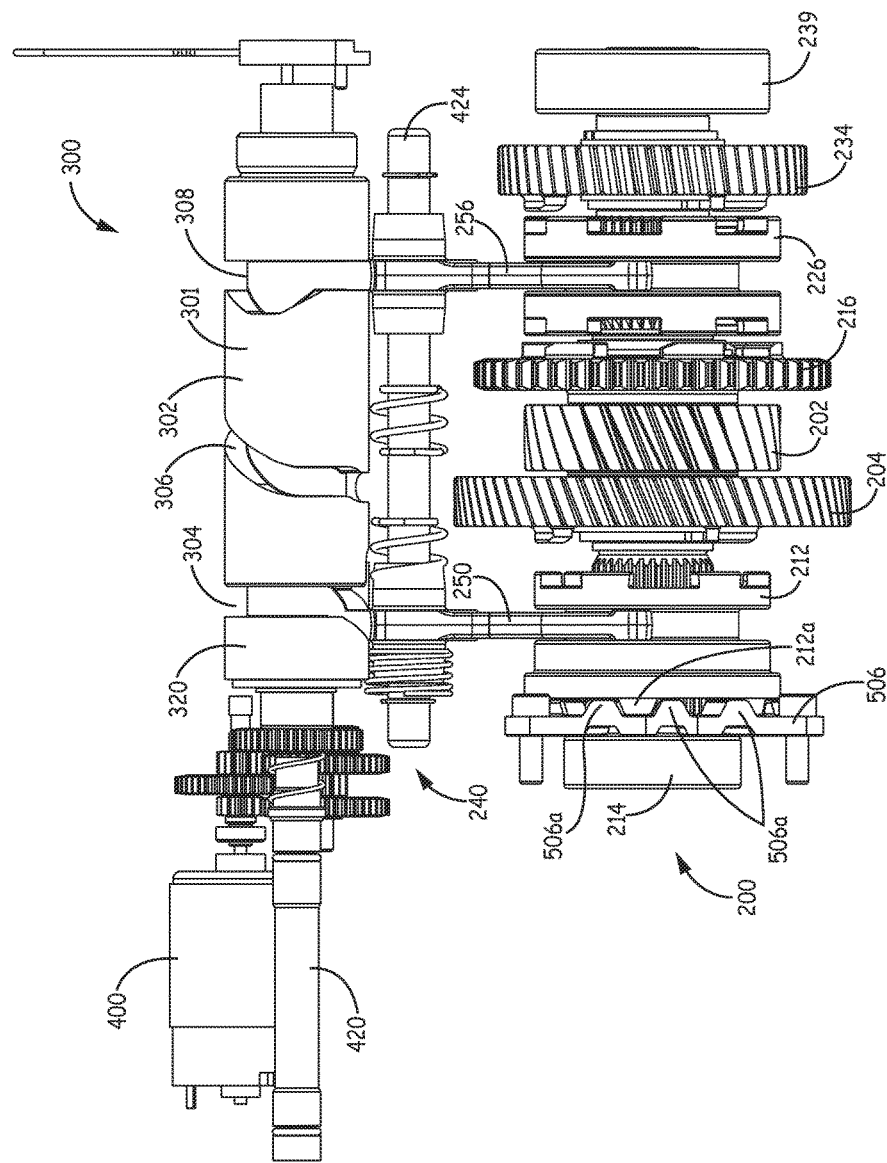
FIG. 8A is a side view of the shift-by-wire components illustrating dog clutch teeth of a park dog clutch meshing with park plate teeth of a park plate of an embodiment of the present invention.
Figure 8B:
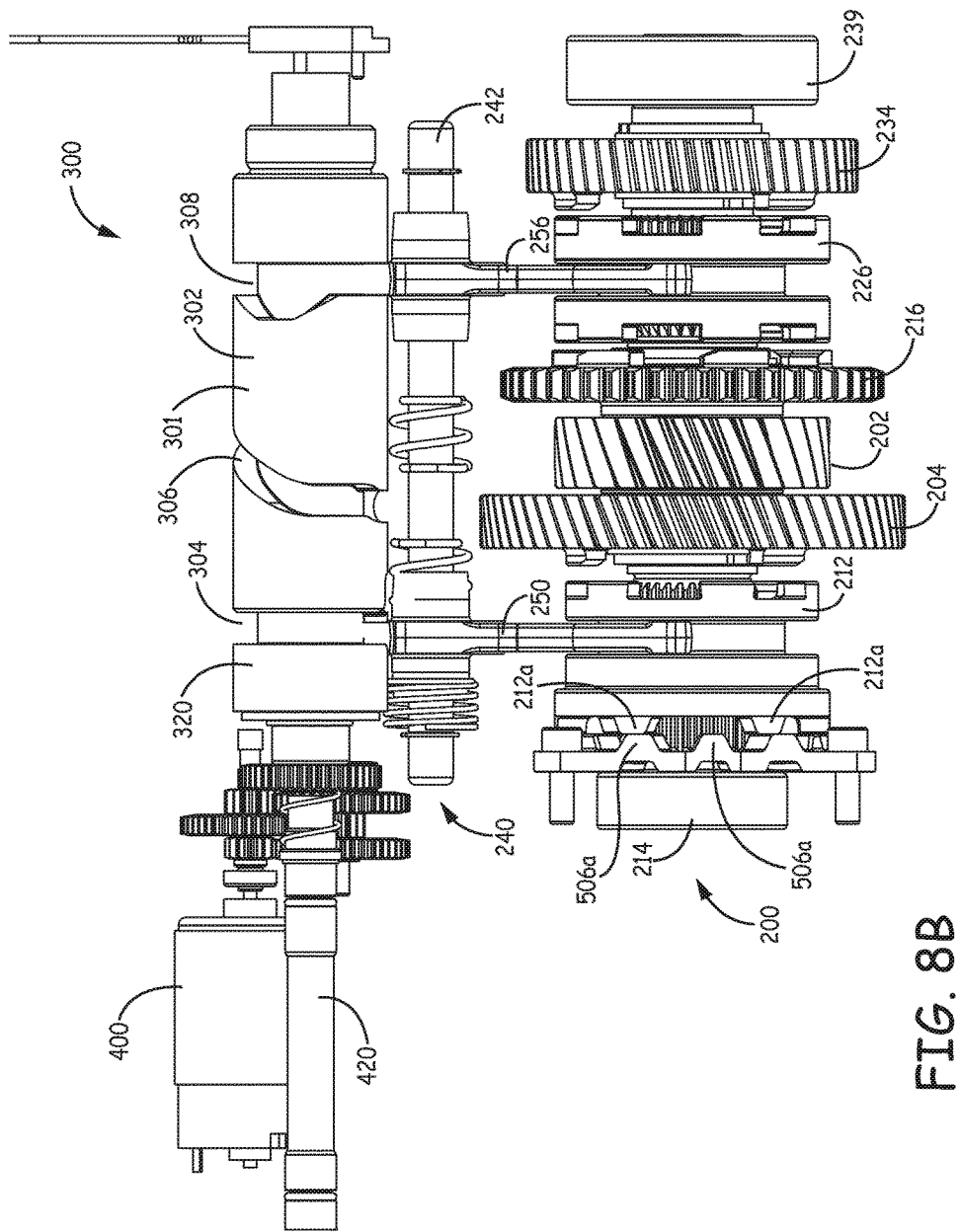
FIG. 8B is a side view of the shift-by-wire components illustrating dog clutch teeth of a park dog clutch not meshing with park plate teeth of a park plate of an embodiment of the present invention.
Figure 9A:
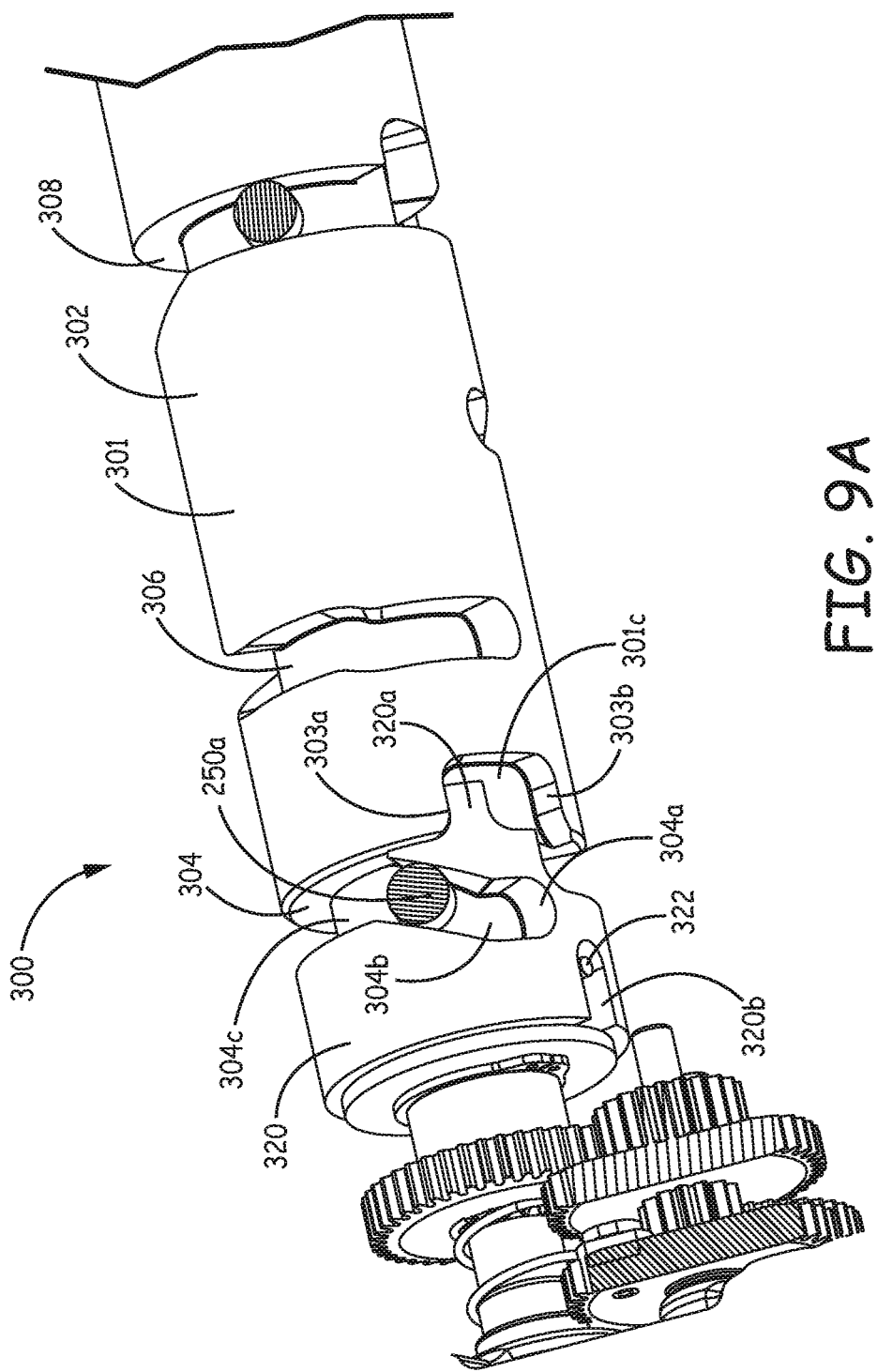
FIG. 9A illustrates a side perspective view of the shift drum assembly illustrating the interaction of a shift cam and shift drum housing with a shift fork positioning pin in a first position within a track.
Figure 9B:
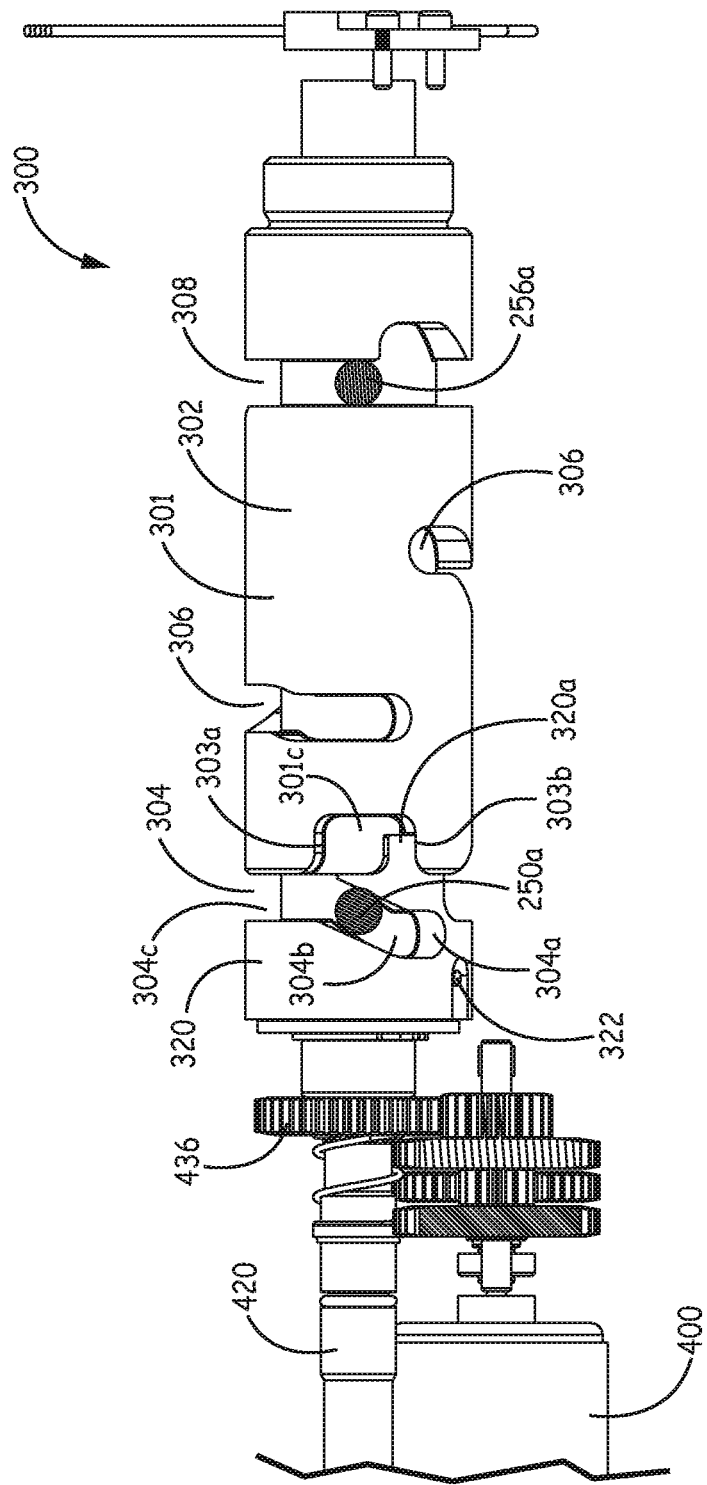
FIG. 9B illustrates a side perspective view of the shift drum assembly illustrating the interaction of the shift cam and shift drum housing with the shift fork positioning pin in a second position within the track.
Figure 9C:
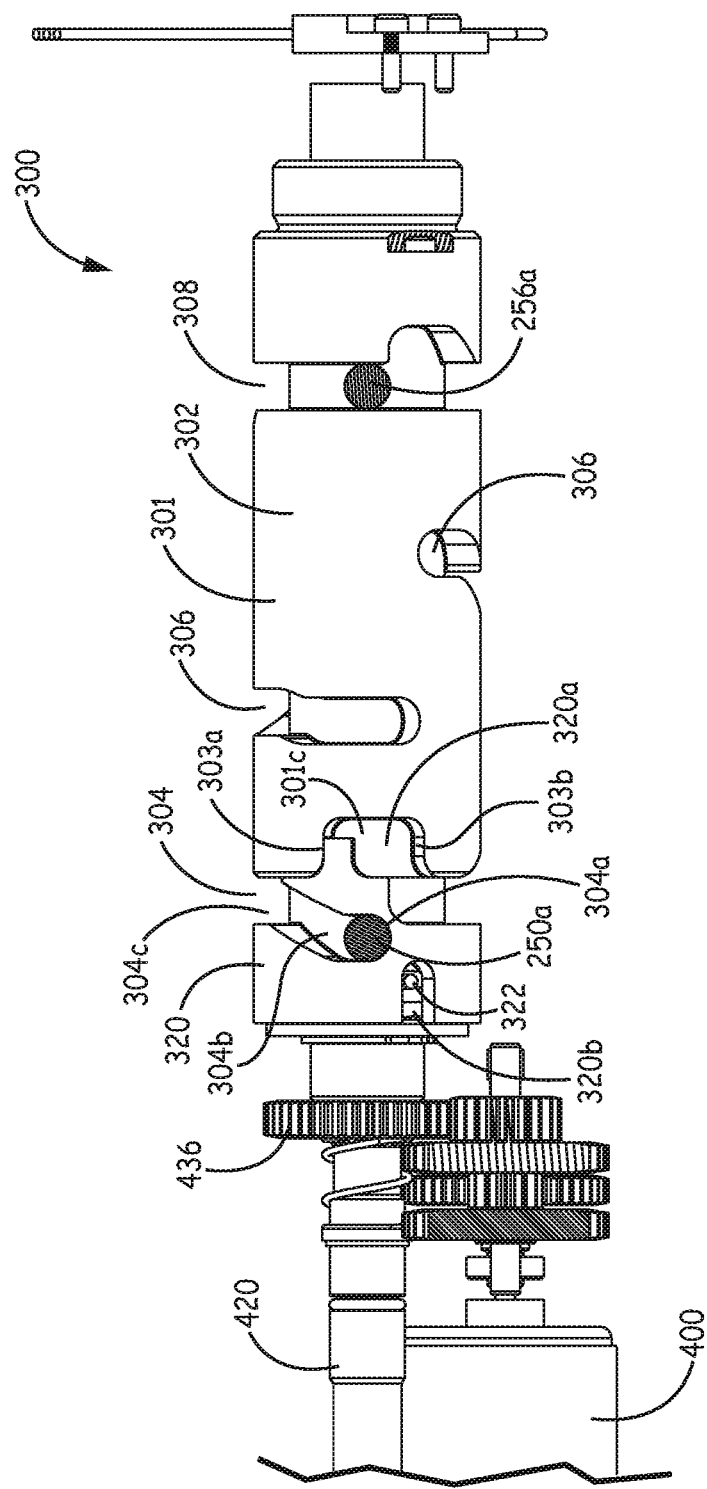
FIG. 9C illustrates a side perspective view of the shift drum assembly illustrating the interaction of the shift cam and shift drum housing with the shift fork positioning pin in a third position within a track.

FIGS. 8A and 8B illustrates a side view of the shift drum assembly 300, the motor 400, the shift fork assembly 240 and the second shaft assembly 200. FIG. 8A illustrates the dog clutch teeth 212a of the park dog clutch 212 meshing with park plate teeth 506a of the park plate 506. FIG. 8B illustrates the dog clutch teeth 212a of the park dog clutch 212 not meshing with park plate teeth 506a of the park plate 506. As described above, the park plate 506 is grounded to the housing 102. FIGS. 9A-9B illustrate the position of the shift fork positioning pin 250a of the park shift fork 250 in track 304 of the shift drum assembly 300 and the shift cam tab 320a of the shift cam 320 in the window 301c of the shift drum housing 301 when the dog clutch teeth 212a of the park dog clutch 212 is not meshed with park plate teeth 506a of the park plate 506. Referring to FIG. 9A, the park shift fork groove 304 includes a first section 304a that is generally perpendicular to an axis of the shift drum housing 301, a second section 304b (or ramp section 304b) that extends generally at an angle from the first section 304a and a third section 304c which is again generally perpendicular to the axis of the shift drum housing 301. The third section 304c extends from the second section 304b . When the teeth 506a and 212a are in a blocked position (not meshed when placed in park or another select gear), the shift fork positioning pin 250a of the park shift fork 250 is in a blocked position that is illustrated in FIG. 9A. In the blocked position the shift fork positioning pin 250a is not aligned with the first section 304a of the park shift fork groove 304. Torque imparted on the shift cam 320 via the shift cam spring 322 causes the shift cam tab 320a to be initially biased against the first side wall 303a of the window 301c as also illustrated in FIG. 9A. As the shift drum housing 301 is rotated by either the torque applied from the electric shift motor 400, or via torque from the manual shift override 420, this torque counters the biasing torque supplied by the shift cam spring 322 via the ramp section 304b engaging the shift fork positioning pin 250b allowing the shift drum housing 301 to rotate in relation to the shift cam 320. When this happens the shift cam tab 320a of the shift cam 320 moves freely in the window 301c of the shift drum housing 301 toward the second side wall as illustrated FIG. 9B. This relative motion creates additional torsion preload in shift cam spring 322 and allows the shift drum 301 to reach its target angular position (park in this example) even though the shift cam 320 and shift fork positioning pin 250a have not. The shift system is now in a state of preload. If the vehicle rolls slightly, rotation at the wheel would cause relative motion between the park dog clutch 212 and the park plate 506, which in turn allows the teeth 212a and 506a to engage. For applications other than Park gear, relative motion at the dog clutches could come from rotation of the input shaft from application of the throttle or rotation of the wheel due to the vehicle rolling. When the teeth 212a and 506a align to allow engagement as shown in FIG. 8A, the shift cam 320 rotates back to its initial position as shown in FIG. 9A and the shift fork positioning pin 250a is pushed up the ramped surface of the shift cam 320 towards its final position 304a . Once the shift fork positioning pin 250a is aligned with the first section 304a of the park shift fork groove 304, the biasing force from the shift cam spring 322 rotates the shift cam 320 so the shift cam tab 320a once again engages the first wall 303a of the window 301c of the shift drum housing 301 as illustrated in FIG. 9C. When the gearbox 100 is shifted out of park, motor 400 rotates the shift drum 302. Because the shift cam tab 320a engages the first wall 303a in the window 301c of the housing 301, the shift cam 320 rotates with the shift drum 302 without use of the shift cam spring 322 (direct-couple out). This moves the shift fork positioning pin 250a of the shift fork 250 out of the first section 304a of the park shift fork groove 304 and into the third section 304c of the park shift groove which in turn moves the park shift dog 212 to move the gearing of the gearbox 100 out of park. As discussed above, this feature is called the "direct-couple out" because it does not require the use of the shift cam spring. In embodiments, the angular width of the window 301c is as large or larger than the angular travel needed to move the shift fork positioning pin 250a from blocked position illustrated in FIG. 9A to the in gear positioned illustrated in FIG. 9C.

Figure 10:
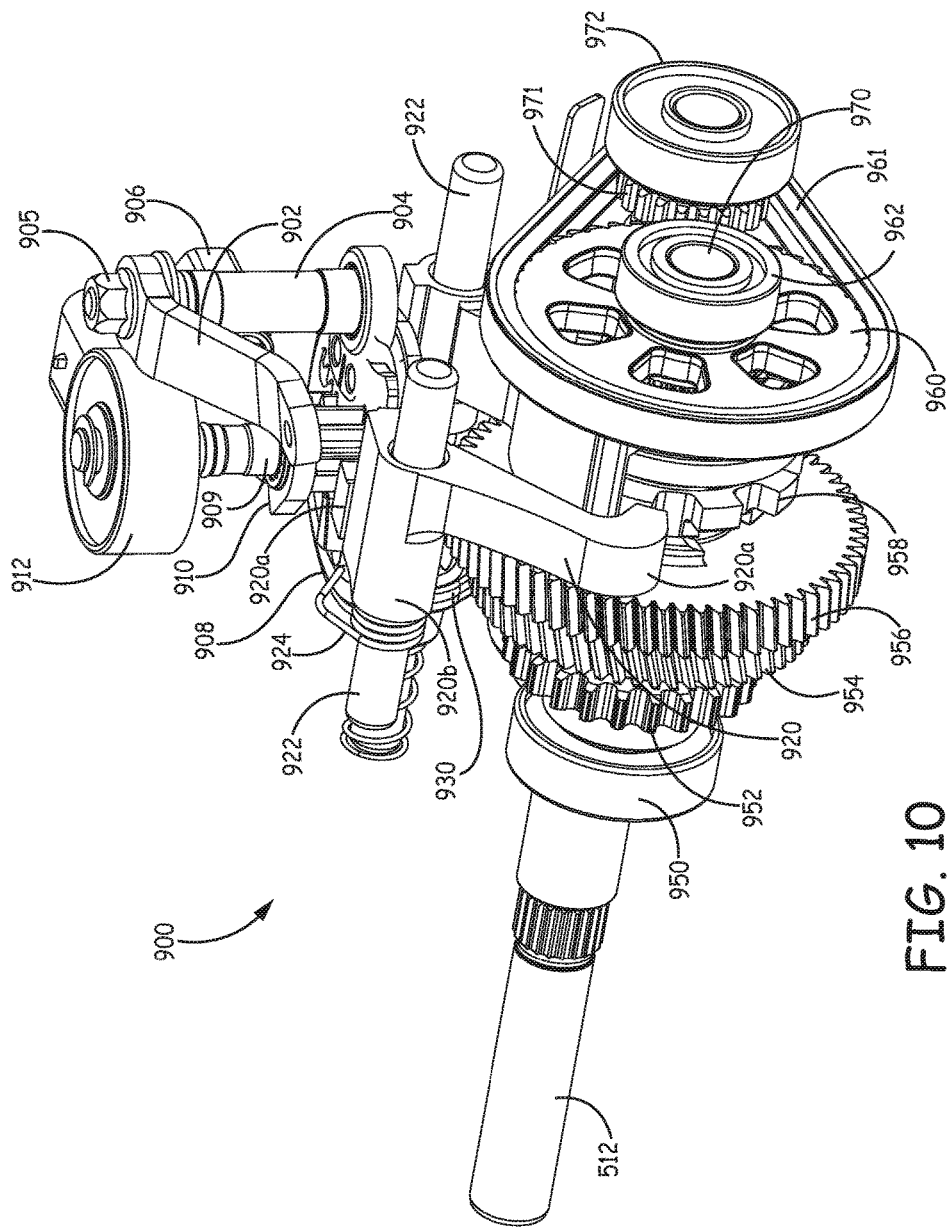
FIG. 10 is a side perspective view of a shifting assembly of another embodiment.
Figure 11:
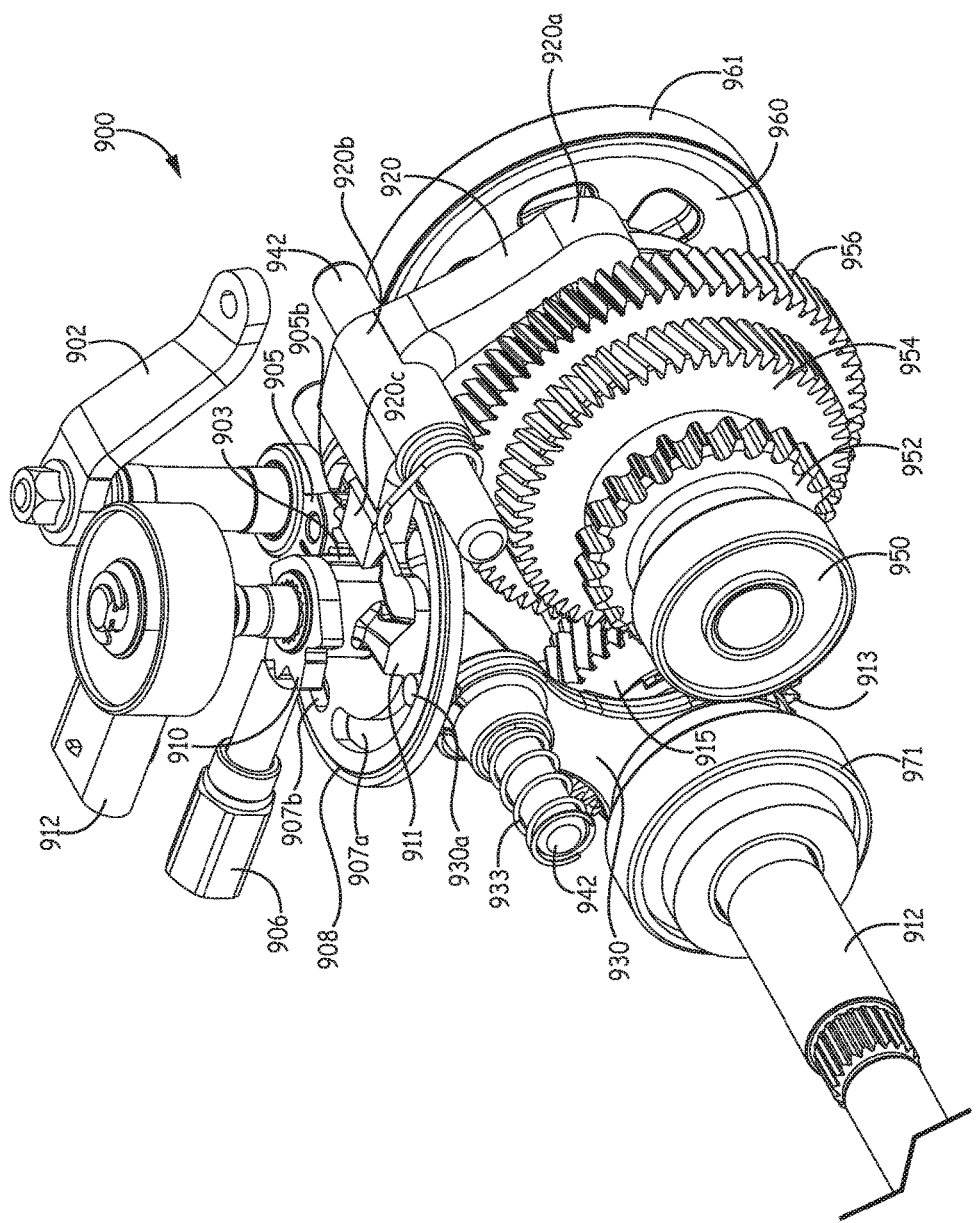
FIG. 11 is a rear perspective view of the shifting assembly of FIG. 10.

FIGS. 10 and 11 illustrate another embodiment of a shift assembly that implements a flat disk cam instead of a shift drum as described above. The shift assembly (shift cam disk cam assembly 900) of FIGS. 10 and 11 includes a shift cam disk 908. The shift cam disk 908 includes shift cutout passage guides 907a and 907b which act as the shift fork grooves 304 and 308 of the shift drum 302 of the shift drum assembly 300 discussed above. For example, a shift fork pin 930a of a shift fork 930 is received in the shift cutout passage 907a. A pin (not shown) of a park shift fork 932 would be received in shift cutout passage 907b. The shift fork 930 is slideably mounted on a second shift shaft 942 similar to shift shaft 242 discussed above. A shift fork biasing member 933 mounted on the second shift shaft 942 biases the shift fork 930. The shift fork 930 engages a shift dog 913 that is slideably mounted on an input shaft 912 in this embodiment. Also illustrated as being mounted on the input shaft 912 in this embodiment are bearings 971 and 972, gear 915 and sprocket 971.

Sprocket 971 is rotational coupled to sprocket 960 via chain 961. Sprocket 960 is mounted on a second shaft 970. Also mounted on the second shaft 970 are bearings 962 and 950 that would be received in respective housing seats (not shown). Further gears 952, 954, 956 and a park lock gear 958 are also mounted on the second shaft 970. The park lock gear 958 includes holding slots 958b that are positioned between park gear teeth 958a. The disk cam assembly 900 also includes a park pawl 920. The park pawl 920 has a first end 920a that is designed to fit in the holding slots 958b of the park lock gear 958 to lock the gearbox 100 in park. The park pawl 920 further has a mid portion 920b that is rotationally mounted on a park pawl shaft 942. A pawl biasing member 924 mounted on the park pawl shaft 922 biases the park pawl 920 so the first end 920a of the park pawl 920 is biased out of the holding slots 958b of the park lock gear 958. Moreover, the park shift fork 932 is configured and arranged to selectively align the park lock gear 958 with the park pawl 920. A parking ramp 911 extends from a surface of the shifting cam disk 908. A second end 920c of the park pawl 920 selectively engages the parking ramp 911 of the shifting cam disk 908 when the shifting cam disk 908 is rotated. The parking ramp 911 asserts a force on the second end 920c of the park pawl 920 to counter the biasing force of pawl biasing member 924. As a result, the first end 920a of the park pawl 920 is received in a holding slot 958b of the park lock gear 958 which locks the transmission in park. The transmission will remain locked in park until the shifting cam disk 908 is rotated. The parking ramp 911 feature could be a separate part that is connected to the shifting cam disk 908 via spring to provide a similar function as the cylindrical shift drum assembly described above.

The shifting cam disk 908 is rotated by a shifting cam disk shift shaft 904. A shift gear member 905 that is locked in rotation with the shifting cam disk shift shaft 904 includes shift gear teeth 905b which mate with shifting cam disk teeth 903 on a centrally located position shaft 909 of the shifting cam disk 908. Coupled to the position shaft 909 is a position sensor 912 configured to sense the then current gear position of the gearbox 100. This embodiment further illustrates a bell crank 902 that is mounted to the shifting cam disk shift shaft 904 via fastener 911 and a detent plunger assembly 906. Rotation of the bell crank 902 changes gearing. The detent plunger assembly 906 is operationally coupled to the position shaft 909 to adjust a gear setting of the shifting assembly 900 if needed. As discussed above, the ramp feature 911 coupled to the shifting disk 908, in an embodiment, provides similar functionality as the shift cam 320 arrangement in shifting into and out of gears of the gear box 100.

Figure 12:
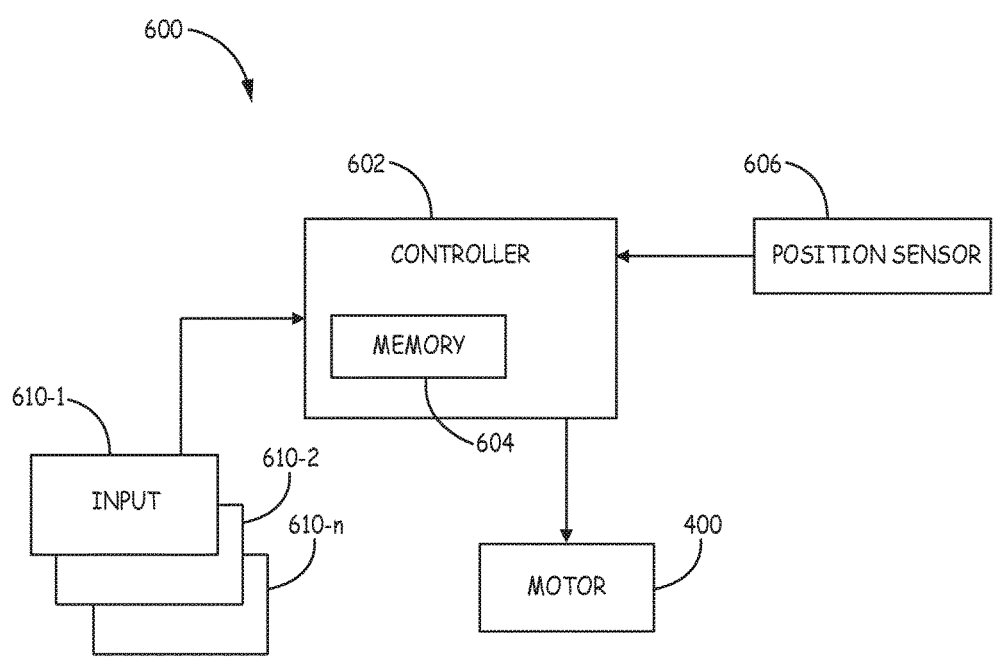
FIG. 12 is a block diagram of a shift control system of one embodiment of the present invention.

Referring to FIG. 12, a block diagram of a shift control system 600 of one embodiment is illustrated. As illustrated, the shift control system 600 includes a controller 602 that is coupled to receive signals from a position sensor 606. The controller 602 (engine control unit in an embodiment) utilizes a detent control algorithm stored in its memory 604 to control the motor 400. In embodiments, after the system receives shift command from the operator, the motor 400 is energized under control of the controller 602 to drive the shift drum 302 to a specific angular target position where it is to remain until a subsequent shift occurs by the operator. Also illustrated in the block diagram are inputs 610 (1-n). An operator of the vehicle uses the inputs 610 (1-n) to convey signals to the controller 602 to shift gears. The electric shift configuration of embodiments makes it possible to have multiple inputs 610 (1-n). For example, there can be independent inputs (switches, levers, dials, buttons, etc.) to select different gear ranges and or functions. In particular, embodiments allow for different operator shift schemes that are optimized for a vehicle's particular market. For example, this will allow the "direction function" and the "gear range function" to be split between multiple operator devices. A first input 610-1 could be used to select between high, low and park ranges and a second input 610-2 could be used to select between forward and reverse. Moreover, the inputs 610 (1-n) can include vehicle inputs such as, but not limited to, ground speed, engine speed, throttle position, etc. that the controller 602 uses to determine when to shift gears.

The controller 602 may be implemented in digital electronic circuitry, or with a programmable processor (for example, a special-purpose processor or a general-purpose processer such as a computer) firmware, software, or in combinations of them. Apparatus embodying these techniques may include appropriate input and output devices, a programmable processor, and a storage medium 604 tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

As discussed above, embodiments use a control algorithm to determine when to shut the motor 400 off as it reaches a target position of a select gear. Due to mechanical inertia and reaction time of the electronic controller 602, there is some tolerance in the stop position. Hence, an acceptable tolerance window is applied. Even with a fairly wide window for a target, however, there is a possibility that the motor will stop at the edge of the target window. The slightest mechanical movement of the drum 302 or electrical signal drift\noise could result in the system being seen as out of the target window. This would cause the motor 400 to energize briefly to jog the drum 302 a very small amount. The motor 400 could end up dithering (turn on, off, on, off, etc.) if it ends up sitting right at the boundary of the target position. The issue is how to hold the mechanical components in a position while the vehicle is subject to vibration. Although a mechanical, spring-loaded, detent system could be used it would add components and cost to the overall system. To help minimize motor size and cost the current draw in duty cycle of the motor needs to be minimized during shifting events. "Dithering" can result in undesirable load cycles, noise, heat, and current draw on the vehicles electrical system. As discussed above, embodiments of the present invention use an electronic detent control algorithm to address this problem. In particular, embodiments use the electric motor 400 and the position control algorithm to prevent unwanted dithering and to act as an electronic detent.

Figure 13A:
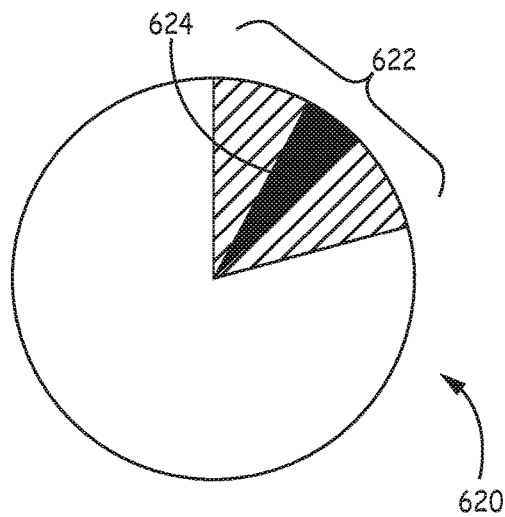
FIG. 13A is a target window pie chart of one embodiment of the present invention.
Figure 13B:
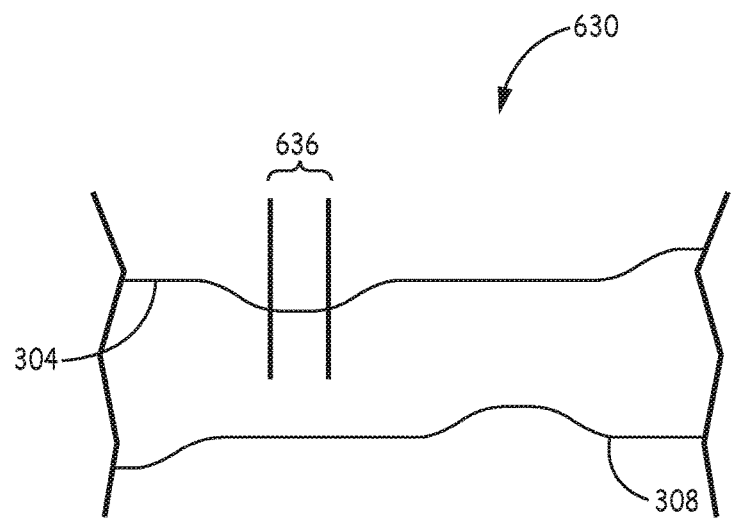
FIG. 13B is a drum cam track graph of one embodiment of the present invention.

Referring to FIG. 13A a target window pie chart 620 of an embodiment is illustrated. The pie chart 620 represents the angular position and size of an "in-gear" section of cam tracks 304, 308. The target window includes a fine adjustment window 624 that is a narrow window that is centered on the nominal target. The target window further includes a coarse adjustment window 622 that is a wider window that is also centered on the nominal target. The span between the fine adjustment window 624 and the coarse adjustment window 622 is sufficiently large so that small mechanical movement of the shift assembly (such as the shift drum assembly 300 or shift cam disk assembly 900 discussed above) or small electrical signal variations will lie between these two limits. The total width of the coarse adjustment window 622 is narrower than shift drums "in-gear" width of the cam track "flat" (i.e. is within an acceptable range for its select gear). In embodiments, as the motor 400 drives the shift assembly to a target position, the position sensor 606 will first see the setting of the shift assembly pass by the edge of the coarse adjustment window 622, then eventually see the setting of the shift assembly enter the fine adjustment window 624. Once the fine adjustment window 624 has been reached, the controller 602 implementing the control algorithm commands the motor 400 to turn off. The control algorithm will not tell the motor 400 to turn on to correct a shift assembly setting (due to mechanical movement or electric signal noise, until the deviation from the target is sufficiently large to fall outside the coarse adjustment window 622. This prevents the controller 602 from constantly cycling the motor on and off (dithering) in order to deal with small mechanical movements of the shift assembly or small electrical noise in the control signals. FIG. 13B illustrates a drum cam track graph 630 which traces out a centerline of the shift drum cam tracks 304 and 308 of the shift drum 302 of the shift drum assembly 300 in an unwrapped flat pattern. The angular span of the coarse adjustment window 622 is less than the width of the in-gear portion 636 (range) of the cam track 308. Each "flat" section of the cam tracks 304 and 308 is where the fork\dog clutch 250, 256, 212, 226 is held in a particular gear.

Figure 14:
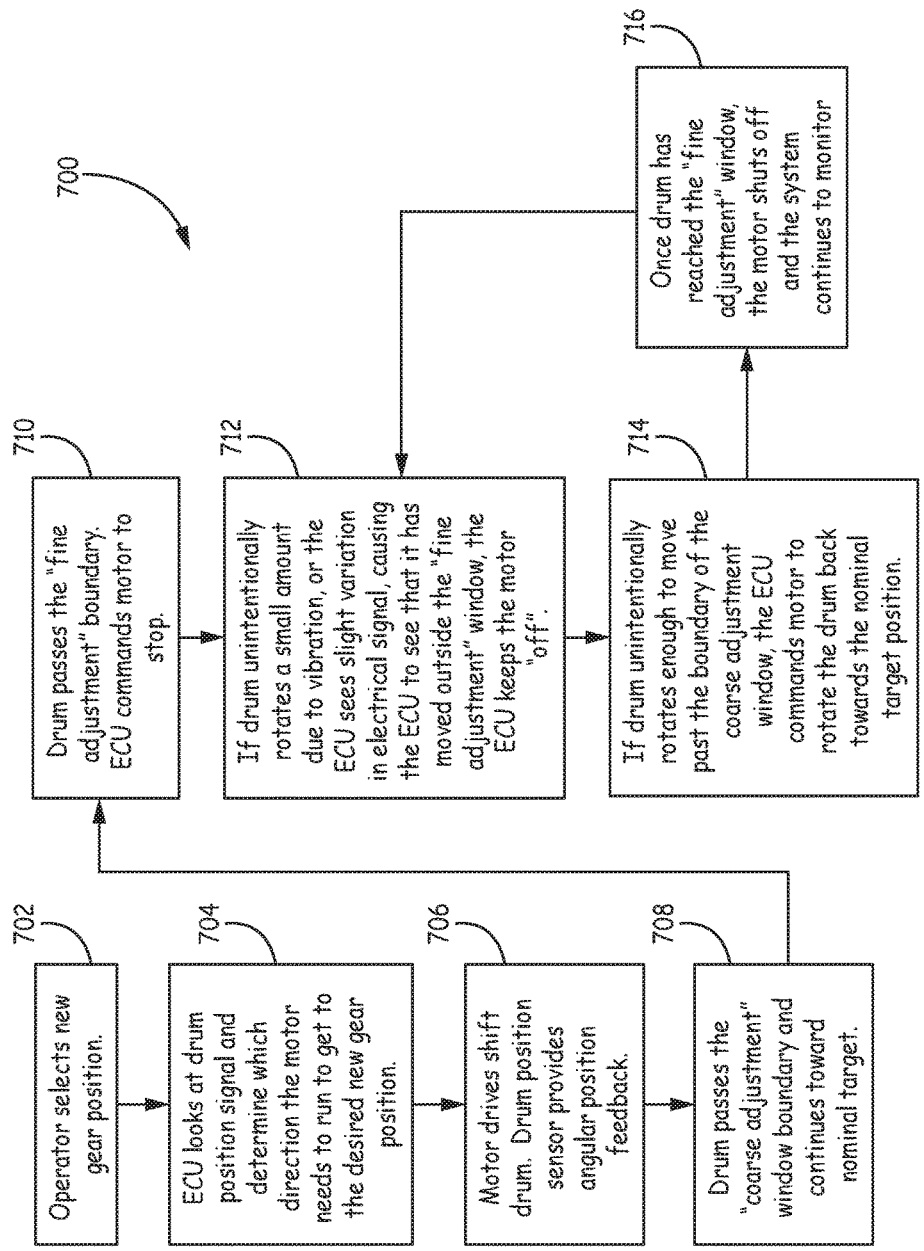
FIG. 14 is an operational flow diagram of one embodiment of the present invention.

FIG. 14 illustrates an operation flow diagram 700 of one embodiment. The process starts with the operator selecting a new gear position (702). Once a new gear position has been selected the engine control unit 602 looks at a drum position signal from the drum position sensor 606 and determines the direction the motor needs to run to get to the desired new gear position (704). The motor 400 rotates the shift assembly in the desired direction. The position sensor 606 provides angular position feedback (706). Receiving signals from the position sensor 606, the engine control unit 602 monitors the setting of the shift assembly passing through the coarse adjustment window 624 boundary towards the nominal target (607). Once the engine control unit 602 observes the setting of the shift assembly passing through the fine adjustment window 624 boundary, the engine control unit 602 stops the motor 400 (714). Subsequently, if the shift assembly setting (such as the position of the shift drum 302) unintentionally rotates a small amount due to vibration, or the engine control unit 602 sees slight variation in the electrical signal, causing the engine control unit 602 to see that it has moved outside the fine window adjustment window 624 but still within the coarse adjustment window 622, the engine control unit 602 keeps the motor off (714). If the shift drum 302 unintentionally rotates enough to move past the boundary of the coarse adjustment window 622, the engine control unit 602 commands the motor 400 to rotate the shift drum 302 back towards the nominal target position (714). Once a drum has again reached the fine adjustment window 624, the motor 400 shuts off (716). The system then continues to monitor the shift drum's position at (712) (i.e. the setting of the shift assembly).

FIGS. 15A through 15E illustrate a target window pie chart 800 with a nominal target position 802 and how the detent control algorithm works in an embodiment. FIG. 15A illustrates the target window pie chart 800 as a new command to shift to a new target position is provided. The motor 400 turns on to rotate the shift drum 302 so the nominal target position 802 setting of the shift assembly is within the target windows. FIG. 15B illustrates that the nominal target position 802 is now within the coarse adjustment window 804 but has not yet reached the fine adjustment window 806 so the motor 400 continues to drive. FIG. 15C illustrates that the nominal target position 802 has now reached the fine adjustment window 806 so the motor 400 is turned off. FIG. 15D illustrates the situation where the shift drum 302 is rotated due to vibration, but is still within the coarse adjustment window 804. In this situation the motor 400 stays off. FIG. 15E illustrates where the shift drum 302 has rotated enough to fall outside the coarse adjustment window 804. In this situation, the motor 400 would be turned on by the controller 602 to jog the position of the shift drum 302 back into the fine adjustment window 806.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. For example, transmission and gearing system for some drive lines may not need "park gear" of the manual override. Therefore, it is manifestly intended that this invention be limited only by the claims and the equivalents thereof.

The invention claimed is:

1. A shift drum assembly for a gear box of a transmission, the shift drum assembly including:
    a shift drum housing having at least one groove guide with a select profile that is configured to receive at least one shift fork positioning pin of a shift fork, the shift drum housing further having a window, the window including a first side wall and a second side wall;
    a shift cam rotationally coupled to the shift drum, the shift cam having a shift cam tab positioned within the window of the shift drum, the shift cam tab configured to selectively move between the first side wall and the second side wall of the window; and
    a bias member configured to bias the shift cam in relation to the shift drum to create a preload force used at least in part to complete a shift when a blocked shift condition of the gear box is encountered.

2. The shift drum assembly of claim 1, further comprising: the shift drum having a shift drum post, the shift cam received around the shift drum post.

3. The shift drum assembly of claim 2, further comprising:
    the bias member received around the shift drum post;
    the shift drum post having a spring holding aperture;
    the shift cam having a spring holding slot; and
    a first end of the bias member received with the spring holding slot of the shift cam and a second end of the bias member received within the spring holding aperture of the shift drum post.

4. The shift drum assembly of claim 1, further comprising:
the at least one groove guide formed by at least one portion of the shift cam;
the at least one portion of the groove guide formed by the shift cam having a ramp section; and
the shift cam tab of the shift cam configured to be initially biased against the first side wall of the window of the shift drum housing during the blocked shift condition, wherein rotation of the shift drum housing in a first direction counters a bias force of the bias member via the at least one shift fork positioning pin of the shift fork engaging the ramp section of the at least one groove guide of the shift cam allowing the shift cam tab of the shift cam to move towards the second side wall of the window of the shift drum therein creating additional torsion preload while allowing the shift drum housing to reach a target angular position even though the shift cam and the shift fork positioning pin have not moved thereby creating a state of preload.

5. The shift drum assembly of claim 4, further wherein movement of the shift fork positioning pin up the ramp section of the shift cam is configured to cause the shift drum assembly to complete the shift.

6. The shift drum assembly of claim 5, wherein movement of the shift fork positioning pin up the ramp section of the shift cam is caused by at least one of rotation of a wheel operationally coupled to the at least one shift fork positioning pin and rotation of an input shaft to the gear box that is operationally coupled to the at least one shift fork positioning pin.

7. The shift drum assembly of claim 1, wherein the shift cam tab of the shift cam is configured to engage the first side wall of the window of the shift drum housing during rotation of the shift drum housing in a second direction.

8. A transmission comprising:
a plurality of gearing assemblies operationally coupled together to provide a select rotational output from a rotational input of an input shaft to the transmission;
at least one shift fork configured and arranged to change gearing of the gearing assembly;
a shift drum housing forming at least a portion of at least one groove guide, the at least one groove guide having a select profile that includes a ramp section, the at least one groove guide configured and arranged to receive at least one shift fork positioning pin of the at least one shift fork, the shift drum housing further having a window, the window including a first side wall and a second side wall;
a shift cam rotationally coupled to the shift drum, the shift cam having a shift cam tab positioned within the window of the shift drum, the shift cam tab configured to selectively move between the first side wall and the second side wall of the window; and
a bias member configured to bias the shift cam in relation to the shift drum to create a preload force used at least in part to complete a shift when a blocked shift condition of a gear box of the transmission is encountered.

9. The transmission of claim 8, further comprising:
the shift drum having a shift drum post, the shift cam received around the shift drum post.

10. The transmission of claim 8, further comprising:
the bias member received around the shift drum post;
the shift drum post having a spring holding aperture;
the shift cam having a spring holding slot; and
a first end of the bias member received with the spring holding slot of the shift cam and a second end of the bias member received within the spring holding aperture of the shift drum post.

11. The transmission of claim 8, further comprising:
the at least one groove guide formed by at least one portion of the shift cam;
the shift cam including the ramp section of the at least one groove guide; and
the shift cam tab of the shift cam configured to be initially biased against the first side wall of the window of the shift drum housing during the blocked shift condition, wherein rotation of the shift drum housing in a first direction counters a bias force of the bias member via the at least one shift fork positioning pin of the shift fork engaging the ramp section of the at least one groove guide of the shift cam allowing the shift cam tab of the shift cam to move towards the second side wall of the window of the shift drum therein creating additional torsion preload while allowing the shift drum housing to reach a target angular position even though the shift cam and the shift fork positioning pin have not moved thereby creating a state of preload.

12. The transmission of claim 11, further wherein movement of the shift fork positioning pin up the ramp section of the shift cam is configured to cause the transmission to complete the shift.

13. The transmission of claim 11, wherein movement of the shift fork positioning pin up the ramp section of the shift cam is caused by at least one of rotation of a wheel operationally coupled to the at least one shift fork positioning pin and rotation of the input shaft to the transmission that is operationally coupled to the at least one shift fork positioning pin.

14. The transmission of claim 8, wherein the shift cam tab of the shift cam is configured to engage the first side wall of the window of the shift drum housing during rotation of the shift drum housing during a shift.

15. The transmission of claim 14, wherein the shift cam tab of the shift cam remains engaged with the first side wall of the window when the shift drum housing rotates in a second direction.

16. A transmission system for a vehicle implementing a gearbox with shift dogs, the transmission system comprising:
an input shaft:
a plurality of gearing assemblies operationally coupled together to provide a select rotational output from a rotational input of the input shaft:
at least one shift fork configured and arranged change gearing of the gearing assembly;
a shift drum housing having a window;
a shift cam rotationally coupled to the shift drum and forming with the shift drum at least one groove guide with a select profile that is configured to receive at least one shift fork positioning pin of the at least one shift fork, the shift cam having a shift cam tab positioned within the window of the shift drum; and
a bias member configured to bias the shift cam in relation to the shift drum to create a preload force used at least in part to complete a shift when a blocked shift condition of the gear box is encountered.

17. The transmission system of claim 16, further comprising:
the shift drum having a shift drum post, the shift cam received around the shift drum post.

18. The transmission system of claim 16, further comprising:
the bias member received around the shift drum post;

the shift drum post having a spring holding aperture;
the shift cam having a spring holding slot; and
a first end of the bias member received with the spring holding slot of the shift cam and a second end of the bias member received within the spring holding aperture of the shift drum post.

19. The transmission system of claim 16, further comprising:
the at least one groove guide formed by at least one portion of the shift cam;
the at least one portion of the groove guide formed by the shift cam having a ramp section;
the a window of the shift drum housing having a first side wall and a second side wall;
the shift cam tab of the shift cam configured to be initially biased against the first side wall of the window of the shift drum housing during the blocked shift condition, wherein rotation of the shift drum housing in a first direction counters a bias force of the bias member via the at least one shift fork positioning pin of the shift fork engaging the ramp section of the at least one groove guide of the shift cam allowing the shift cam tab of the shift cam to move towards the second side wall of the window of the shift drum therein creating additional torsion preload while allowing the shift drum housing to reach a target angular position even though the shift cam and the shift fork positioning pin have not moved thereby creating a state of preload.

20. The transmission system of claim 16, further comprising:
a primary clutch that is configured to be coupled to a motor;
a secondary clutch that is configured to be in rotational communication with the primary clutch via belt, the input shaft operationally coupled to the secondary clutch.

21. A shift drum assembly for a gear box of a transmission, the shift drum assembly including:
a shift drum housing having at least one groove guide with a select profile that is configured to receive at least one shift fork positioning pin of a shift fork;
a shift cam rotationally coupled to the shift drum;
one of the shift drum and the shift cam having a window, the window including a first side wall and a second side wall;
another of the shift drum and the shift cam having a tab positioned within the window, the tab configured to selectively move between the first side wall and the second side wall of the window; and
a bias member configured to bias the shift cam in relation to the shift drum to create a preload force used at least in part to complete a shift when a blocked shift condition of the gear box is encountered.

* * * * *